(12) United States Patent
Tsukada

(10) Patent No.: US 12,202,358 B2
(45) Date of Patent: Jan. 21, 2025

(54) POWER SUPPLY SYSTEM AND MOVING BODY

(71) Applicant: HONDA MOTOR CO., LTD., Tokyo (JP)

(72) Inventor: Yoshinari Tsukada, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 262 days.

(21) Appl. No.: 17/805,867

(22) Filed: Jun. 8, 2022

(65) Prior Publication Data

US 2022/0393614 A1 Dec. 8, 2022

(30) Foreign Application Priority Data

Jun. 8, 2021 (JP) ................................. 2021-095868

(51) Int. Cl.
*H02M 1/10* (2006.01)
*B60L 50/51* (2019.01)
(Continued)

(52) U.S. Cl.
CPC ............... *B60L 50/51* (2019.02); *B60L 50/60* (2019.02); *B60L 2210/40* (2013.01); *H02M 7/5387* (2013.01)

(58) Field of Classification Search
CPC .. H02M 1/0048; H02M 7/797; H02M 1/0054; H02M 3/33573; H02M 3/33584; H02M 1/10; H02M 3/1582; H02M 7/53871; H02M 7/5387; H02M 1/0093; H02M 3/337; H02M 3/158; H02M 1/007; B60L 53/22; B60L 50/60; B60L 53/24;
(Continued)

(56) References Cited

U.S. PATENT DOCUMENTS

| 10,396,681 B1 | 8/2019 | Bassi et al. |
| 2009/0267417 A1* | 10/2009 | Lee ..................... H02M 1/10 307/65 |

(Continued)

FOREIGN PATENT DOCUMENTS

| CN | 103856047 A | 6/2014 |
| CN | 205265555 U | 5/2016 |

(Continued)

OTHER PUBLICATIONS

Office Action issued Aug. 16, 2024 in the CN Patent Application No. 202210638517.8.

*Primary Examiner* — Gabriel Agared
(74) *Attorney, Agent, or Firm* — CKC & Partners Co., LLC

(57) ABSTRACT

A power supply system 1 includes: a variable voltage power supply 7 that outputs power of a variable voltage E1 from a pair of secondary-side input/output terminals 72p and 72n; a first power line 21 and a second power line 22 that connect the pair of secondary-side input/output terminals 72p and 72n and a load 4; a first switch unit 31 that is provided on the first power line 21; a third power line 23 that connects both ends of the first switch unit 31; and a bypass line 25 that connects the pair of secondary-side input/output terminals 72p and 72n, a first DC power supply 38 is provided on the third power line 23 to output DC power, and a bypass diode 33a is provided on the bypass line 25 to allow an output current of the first DC power supply 38.

20 Claims, 10 Drawing Sheets

(51) Int. Cl.
    *B60L 50/60*     (2019.01)
    *H02M 3/158*     (2006.01)
    *H02M 7/5387*     (2007.01)

(58) Field of Classification Search
    CPC .. B60L 50/51; B60L 2210/30; B60L 2210/10; B60L 2210/40; Y02T 10/70
    USPC ........................................................ 318/440
    See application file for complete search history.

(56) References Cited

U.S. PATENT DOCUMENTS

| | | | |
|---|---|---|---|
| 2014/0152276 A1 | 6/2014 | Kobayashi et al. | |
| 2015/0311799 A1* | 10/2015 | Okaniwa | B60L 58/20 |
| | | | 323/271 |
| 2016/0164440 A1* | 6/2016 | Kataoka | G05F 1/67 |
| | | | 318/400.3 |
| 2016/0248247 A1* | 8/2016 | Origane | H02J 1/08 |
| 2016/0268903 A1 | 9/2016 | Miyaki et al. | |
| 2017/0201204 A1 | 7/2017 | Kawano et al. | |
| 2019/0312526 A1* | 10/2019 | Lee | H02J 7/35 |
| 2021/0028641 A1* | 1/2021 | Ilic | H02J 7/00714 |
| 2021/0218345 A1* | 7/2021 | Yamaguchi | H02M 1/322 |

FOREIGN PATENT DOCUMENTS

| | | |
|---|---|---|
| CN | 112260568 A | 1/2021 |
| JP | S5782842 U | 5/1982 |
| JP | 2015216825 A | 12/2015 |
| JP | 2016167911 A | 9/2016 |
| JP | 2020022299 A | 2/2020 |
| WO | 2015056491 A1 | 4/2015 |
| WO | 2016038683 A1 | 3/2016 |
| WO | 2019004015 A1 | 1/2019 |

* cited by examiner

FIG. 4

| | VOLTAGE RELATIONSHIP | VARIABLE VOLTAGE E1 | BYPASS SWITCH UNIT | FIRST SWITCH UNIT | FIRST DC POWER SUPPLY | SECOND SWITCH UNIT | SECOND DC POWER SUPPLY | TIMING |
|---|---|---|---|---|---|---|---|---|
| DURING POWER RUNNING | Vout<E2 (ONE-STAGE CONNECTION) | 0<E1<E2 | OFF | Di | OFF | OFF | OFF | t0~t1 |
| | Vout≒E2 | E1≒E2 | OFF | Di | OFF | OFF | OFF | t1 |
| | | E1≒0 | Di | OFF | ON | Di | OFF | t2 |
| | E2<Vout<E2+E3 (TWO-STAGE CONNECTION) | 0<E1<E3 | OFF | OFF | ON | Di | OFF | t2~t3 t5~t6 |
| | Vout≒E2+E3 | E1≒E3 | OFF | OFF | ON | Di | OFF | t6 |
| | | E1≒0 | Di | OFF | ON | OFF | ON | t7 |
| | Vout>E2+E3 (THREE-STAGE CONNECTION) | 0<E1<E1max | OFF | OFF | ON | OFF | ON | t7~t8 |
| DURING REGENERATION | Vout<E2 (ONE-STAGE CONNECTION) | 0<E1<E2 | OFF | ON | OFF | OFF | OFF | t0~t1 |
| | Vout≒E2 | E1≒E2 | OFF | ON | OFF | OFF | OFF | t1 |
| | | E1≒0 | ON | OFF | ON | ON | OFF | t2 |
| | Vout>E2 (TWO-STAGE CONNECTION) | 0<E1<E3 | OFF | OFF | ON | ON | OFF | t2~t3 t5~t6 |
| | Vout≒E2+E3 | E1≒E3 | OFF | OFF | ON | ON | OFF | t6 |
| | | E1≒0 | ON | OFF | ON | OFF | ON | t7 |
| | Vout>E2+E3 (THREE-STAGE CONNECTION) | 0<E1<E1max | OFF | OFF | ON | OFF | ON | t7~t8 |

POWER SUPPLY SYSTEM AND MOVING BODY

This application is based on and claims the benefit of priority from Japanese Patent Application No. 2021-095868, filed on 8 Jun. 2021, the content of which is incorporated herein by reference.

BACKGROUND OF THE INVENTION

Field of the Invention

The present invention relates to a power supply system and a moving body. More specifically, the present invention relates to a power supply system that supplies power to a load and a moving body in which the power supply system is equipped.

Related Art

For example, an electric vehicle is equipped with a power converter that converts DC power output from a battery into AC power and supplies the AC power to a rotating electric machine connected to drive wheels. Many power converters converts DC power into AC power by switching on/off of switching elements of at least two arms connected in series to a load, and thus switching loss occurring during turn-on and turn-off of the switching elements and steady loss proportional to on-resistance of the switching elements occur (for example, see Patent Document 1).

In the power converter disclosed in Patent Document 1, DC power output from a multi-stage DC chopper circuit is smoothed by a smoothing circuit, and then a loopback circuit makes a half-wave a negative voltage and combines a half-wave of a positive voltage and the half-wave of the negative voltage to generate AC power.

Patent Document 1: PCT International Publication No. WO2019/004015

SUMMARY OF THE INVENTION

However, since the power converter disclosed in Patent Document 1 uses a multi-stage DC chopper circuit, the number of switching elements increases in proportion to the number of stages of the DC voltage, and thus switching loss also increases accordingly.

Further, since on-resistance of the switching element tends to increase as a withstand voltage of the switching element increases, it is preferable to use a switching element having as low a withstand voltage as possible in order to reduce the steady loss. However, in general, the withstand voltage of the switching element needs to be sufficiently higher than the maximum voltage of the battery in consideration of a surge voltage generated at the time of turn-on or turn-off. For this reason, in the multi-stage DC chopper circuit disclosed in Patent Document 1, it is necessary to increase the withstand voltage of the switching element in proportion to the number of stages of the DC voltage, and thus the steady loss also increases accordingly.

An object of the present invention is to provide a power supply system and a moving body capable of reducing switching loss and steady loss as compared with the related art.

(1) A power supply system (for example, a power supply system 1 or 1A to be described below) according to the present invention includes: a variable voltage power supply (for example, a variable voltage power supply 7 to be described below) that outputs power of a variable voltage from a pair of first terminals (for example, a pair of secondary-side input/output terminals $72p$ and $72n$ to be described below); a first power line (for example, a first power line 21 to be described below) and a second power line (for example, a second power line 22 to be described below) that connect the pair of first terminals and a load (for example, a load 4 to be described below); a first switch (for example, a first switch $31b$ to be described below) that is provided on the first power line; a third power line (for example, a third power line 23 to be described below) that connects both ends of the first switch; and a bypass line (for example, a bypass line 25 to be described below) that connects the pair of first terminals, the third power line is provided with a first DC power supply (for example, a first DC power supply 38 or 38A) that outputs DC power, and the bypass line is provided with a bypass diode (for example, a bypass diode $33a$ to be described below) that allows an output current of the first DC power supply and cuts off a current reverse to the output current.

(2) In this case, preferably, the power supply system includes a second switch (for example, a second switch $32b$ to be described below) that is provided closer to the load than the first DC power supply of the third power line, a fourth power line (for example, a fourth power line 24 to be described below) that connects both ends of the second switch, and a second DC power supply (for example, a second DC power supply 39 or 39A to be described below) that is provided on the fourth power line.

(3) In this case, preferably, the first power line is provided with a first diode (for example, a first diode $31a$ to be described below) and a first switch which are connected in parallel to each other, the first diode being configured to allow an output current of the variable voltage power supply and cut off a current reverse to the output current, the bypass line is provided with the bypass diode and a bypass switch (for example, a bypass switch $33b$ to be described below) which are connected in parallel to each other, and the third power line is provided with a second diode (for example, a second diode $32a$ to be described below) and the second switch which are connected in parallel to each other, the second diode being configured to allow the output current of the first DC power supply and cut off the current reverse to the output current.

(4) In this case, preferably, the power supply system includes a power supply driver (for example, a power supply driver 61 to be described below) that changes a voltage between the pair of first terminals from 0 to a predetermined maximum voltage by operating the variable voltage power supply.

(5) In this case, preferably, the power supply system includes controllers (for example, a switch controllers 62 and a DC power supply controller 63 or 63A to be described below) that control the first switch, the second switch, the bypass switch, the first DC power supply, and the second DC power supply, based on a system voltage which is a voltage between the first and second power lines.

(6) In this case, preferably, during power running in which the power in the first and second power lines is supplied to the load, the controller turns off the second switch, the bypass switch, the first DC power supply, and the second DC power supply when changing the system voltage in a range less than a first voltage of the first DC power supply, the controller turns on the first DC power supply and turns off the first switch, the bypass switch, and the second DC power supply when changing the system voltage in a range larger than the first voltage and less than a sum of the first voltage and a second voltage of the second DC power supply, and the controller turns on the first DC power supply and the second DC power supply and turns off the first switch, the second switch, and the bypass switch when changing the system voltage in a range larger than the sum of the first voltage and the second voltage.

(7) in this case, preferably, during the power running, the controller switches the first DC power supply from off to on before the voltage between the pair of first terminals becomes 0 when raising the system voltage across the first voltage, the controller switches the first DC power supply from on to off before the voltage between the pair of first terminals becomes the first voltage when lowering the system voltage across the first voltage, the controller switches the second DC power supply from off to on before the voltage between the pair of first terminals becomes 0 when raising the system voltage across the sum of the first voltage and the second voltage, and the controller switches the second DC power supply from on to off before the voltage between the pair of first terminals becomes the second voltage when lowering the system voltage across the sum of the first voltage and the second voltage.

(8) In this case, preferably, during regeneration in which the power in the load is supplied to the first and second power lines, the controller turns on the first switch and turns off the second switch, the bypass switch, the first DC power supply, and the second DC power supply when changing the system voltage in a range less than a first voltage of the first DC power supply, the controller turns on the second switch and the first DC power supply and turns off the first switch, the bypass switch, and the second DC power supply when changing the system voltage in a range larger than the first voltage and less than a sum of the first voltage and a second voltage of the second DC power supply, and the controller turns on the first DC power supply and the second DC power supply and turns off the first switch, the second switch, and the bypass switch when changing the system voltage in a range larger than the sum of the first voltage and the second voltage.

(9) In this case, preferably, during the regeneration, the controller switches the first switch from on to off and switches the first DC power supply and the second switch from off to on before the voltage between the pair of first terminals becomes 0 when raising the system voltage across the first voltage, the controller switches the first switch from off to on and switches the first DC power supply and the second switch from on to off before the voltage between the pair of first terminals becomes the first voltage when lowering the system voltage across the first voltage, the controller switches the second switch from on to off and switches the second DC power supply from off to on before the voltage between the pair of first terminals becomes 0 when raising the system voltage across the sum of the first voltage and the second voltage, and the controller switches the second switch from off to on and switches the second DC power supply from on to off before the voltage between the pair of first terminals becomes the second voltage when lowering the system voltage across the sum of the first voltage and the second voltage.

(10) in this case, preferably, the controller turns on the bypass switch during the regeneration while the voltage between the pair of first terminals is 0.

(11) In this case, preferably, the first DC power supply includes a first battery (for example, a first battery 381 to be described below) and a first battery switch (for example, a first battery switch 382 to be described below) that are connected in series to the third power line, the second DC power supply includes a second battery (for example, a second battery 391 to be described below) and a second battery switch (for example, a second battery switch 392 to be described below) that are connected in series to the fourth power line, and the controller turns on the first DC power supply by turning on the first battery switch, and turns on the second DC power supply by turning on the second battery switch.

(12) In this case, preferably, the first DC power supply is an isolated bidirectional DC/DC converter in which a primary-side circuit is connected to a main battery and a secondary-side circuit is connected to the third power line, the second DC power supply is an isolated bidirectional DC/DC converter in which a primary-side circuit is connected to the main battery and a secondary-side circuit is connected to the fourth power line, and the controller turns on the first DC power supply by driving the primary-side circuit and/or the secondary-side circuit of the first DC power supply, and turns on the second DC power supply by driving the primary-side circuit and/or the secondary-side circuit of the second DC power supply.

(13) A moving body (for example, a vehicle V to be described below) according to the present invention includes: an AC rotating electrical machine (for example, an AC rotating electrical machine M to be described below) that generates a propulsive force; a U-phase power supply (for example, a U-phase power supply 3U to be described below) that is the power supply system according to any one of (1) to (12) described above; a V-phase power supply (for example, a V-phase power supply 3V to be described below) that is the power supply system according to any one of (1) to (12) described above; and a W-phase power supply (for example, a W-phase power supply 3W to be described below) that is the power supply system according to any one of (1) to (12) described above, the U-phase power supply is connected to both ends of a U-phase leg (for example, a U-phase leg 9U to be described below) connected to a U-phase of the AC rotating electrical machine, the V-phase power supply is connected to both ends of a V-phase leg (for example, a V-phase leg 9V to be described below) connected to a V-phase of the AC rotating electrical machine, and the W-phase power supply is connected to both ends of a W-phase leg (for example, a W-phase leg 9W to be described below) connected to a W-phase of the AC rotating electrical machine.

(1) The power supply system according to the present invention includes the variable voltage power supply, the first and second power lines that connect the pair of first terminals of the variable voltage power supply and the load, the first switch provided on the first power line, the third power line that is connected to the first power line so as to bypass the first switch, and the first DC power supply that is connected to the third power line. According to the present invention, when the system voltage, which is the voltage between the first and second power lines, is changed in a range less than the first voltage of the first DC power supply (when a low voltage is applied), the first switch is turned on, whereby the system voltage can be changed only by the output of the variable voltage power supply. Further, according to the present invention, when the system voltage is changed in a range more than the first voltage (when a high voltage is applied), the first switch is turned off, and the variable voltage of the variable voltage power supply is superimposed on the DC voltage of the first DC power supply, whereby the system voltage can be changed in the range larger than the first voltage. Therefore, according to the present invention, since it is not necessary to operate the switch in order to change the voltage applied to the load both when the low voltage is applied and when the high voltage is applied, it is not necessary to increase the number of switches in a case of making the voltage multiple stages. For this reason, it is possible to reduce the number of switches as compared with the case of making the voltage multiple stages by the multi-stage DC chopper circuit as disclosed in Patent Document 1, for example, and thus it is possible to reduce switching loss and steady loss to that extent.

Further, according to the present invention, as described above, it is not necessary to operate the switch to change the voltage during the high-voltage application, and thus it is not necessary to consider a surge voltage during the high-voltage application in a case of designing the withstand voltage of the switch included in the power supply system. Therefore, according to the present invention, it is possible to lower the withstand voltage of the switch included in the power supply system as compared with the case of making the voltage multiple stages by the multi-stage DC chopper circuit as disclosed in Patent Document 1, for example, and thus it is possible to reduce steady loss in the switch and to further reduce costs of the switch.

Further, according to the present invention, as described above, it is not necessary to operate the switching circuit to change the voltage during the high-voltage application, and thus a high frequency component of the voltage applied to the load can be reduced, whereby it is also possible to reduce iron loss.

The power supply system according to the present invention includes the bypass line that connects the pair of first terminals of the variable voltage power supply, and the bypass diode provided on the bypass line, the bypass diode allows the output current of the first DC power supply and cuts off the current reverse to the output current. Therefore, according to the present invention, the variable voltage of the variable voltage power supply can be changed within a predetermined range including 0 while the first DC power supply and the variable voltage power supply are connected in series to the load, and thus controllability of the system voltage, which is the voltage between the first power line and the second power line, is excellent.

(2) The power supply system according to the present invention includes the second switch provided on the third power line, the fourth power line that connects both ends of the second switch, and the second DC power supply provided on the fourth power line. According to the present invention, the variable voltage power supply can be connected to the load (one-stage connection) when the first switch is turned on, the variable voltage power supply and the first DC power supply can be connected in series to the load (two-stage connection) when the first switch is turned off and the first DC power supply is turned on, and the variable voltage power supply, the first DC power supply, and the second DC power supply can be connected in series to the load (three-stage connection) when the first and second switches are turned off and the first and second DC power supplies are turned on.

(3) in the power supply system according to the present invention, the first diode and the first switch are connected in parallel to the first power line, the bypass diode and the bypass switch are connected in parallel to the bypass line, and the second diode and the second switch are connected in parallel to the third power line. According to the present invention, it is possible to prevent the current from flowing in an unintended direction during power running and during regeneration of the power supply system.

(4) The power supply system according to the present invention includes the power supply driver that changes the voltage between the pair of first terminals from 0 to a predetermined maximum voltage by operating the variable voltage power supply. According to the present invention, it is possible to shape the waveform of the variable voltage of the power output: from the variable voltage power supply by the power supply driver into a preferred waveform, and thus it is possible to supply the AC power having the preferred waveform to the load without operating the power supply system and the switch included in the switching circuit connected between the power supply system and the load while the variable voltage is applied to the load.

(5) According to the power supply system of the present invention, the controller can switch the power circuit formed by the power supply system among the one-stage connection, the two-stage connection, and the three-stage connection at an appropriate timing such that the system voltage is not disturbed, by controlling the first and second switches, the bypass switch, and the first and second DC power supplies based on the system voltage.

(6) In the power supply system according to the present invention, the controller turns off the second switch, the bypass switch, and the first and second DC power supplies during power running when changing the system voltage in the range less than the first voltage, whereby only the variable voltage power supply is connected to the load (that is, the one-stage connection), and the power output from the variable voltage power supply can be supplied to the load. The controller turns on the first DC power supply and turns off the first switch, the bypass switch, and the second DC power supply during power running when changing the system voltage in the range larger than the first voltage and less than the sum of the first and second voltages, whereby the variable voltage power supply and the first DC power supply are connected in series to the load (that is, two-stage connection), and the power output from the variable voltage power supply and the first DC power supply can be supplied to the load. In addition, the controller turns on the first and second DC power supplies and turns off the first and second switches and the bypass switch during power running when changing the system voltage in the range larger than the sum of the first and second voltages, whereby the variable voltage power supply, the first DC power supply, and the second DC power supply are connected in series to the load (that is, three-stage connection), and the power output from the variable voltage power supply, the first DC power supply, and the second DC power supply can be supplied to the load.

(7) In the power supply system according to the present invention, the controller switches the first DC power supply on or off during power running before the voltage between the pair of first terminals becomes 0 or the first voltage when raising or lowering the system voltage across the first voltage, whereby it is possible to prevent a large change in the system voltage during switching between the one-stage connection and the two-stage connection. Further, the controller switches the second DC power supply on or off during power running before the voltage between the pair of first terminals becomes 0 or the second voltage when raising or lowering the system voltage across the sum of the first and second voltages, whereby it is possible to prevent a large change in the system voltage during switching between the two-stage connection and the three-stage connection.

(8) In the power supply system according to the present invention, the controller turns on the first switch and turns off the second switch, the bypass switch, and the first and second DC power supplies during regeneration when changing the system voltage in the range less than the first voltage, whereby only the variable voltage power supply can be connected to the load (that is, one-stage connection), and the regenerative power can be supplied to the variable voltage power supply. The controller turns on the second switch and the first DC power supply and turns off the first switch, the bypass switch, and the second DC power supply during regeneration when changing the system voltage in the range larger than the first voltage and less than the sum of the first and second voltages, whereby the variable voltage power supply and the first DC power supply are connected in series to the load (that is, two-stage connection), and the regenerative power can be divided to be supplied to the first DC power supply and the variable voltage power supply. In addition, the controller turns on the first and second. DC power supplies and turns off the first and second switches and the bypass switch during regeneration when changing the system voltage in the range larger than the sum of the first and second voltages, whereby the variable voltage power supply, the first DC power supply, and the second DC power supply are connected in series to the load (that is, three-stage connection), and the regenerative power can be divided to be supplied to the first DC power supply, the second DC power supply, and the variable voltage power supply.

(9) In the power supply system according to the present invention, during regeneration, the controller switches the first switch from on to off and the first DC power supply and the second switch from off to on before the voltage between the pair of first terminals becomes 0 when raising the system voltage across the first voltage, and switches the first switch from off to on and the first DC power supply and the second switch from on to off before the voltage between pair of first terminals becomes the first voltage when lowering the system voltage across the first voltage. Thus, it is possible to prevent a large change in the system voltage during switching between the one-stage connection and the two-stage connection. Further, during regeneration, the controller switches the second switch from on to off and switches the second DC power supply from off to on before the voltage between the pair of first terminals becomes 0 when raising the system voltage across the sum of the first and second voltages, and switches the second switch from off to on and the second DC power supply from on to off before the voltage between pair of first terminals becomes the second voltage when lowering the system voltage across the sum of the first and second voltages. Thus, it is possible to prevent a large change in the system voltage during switching between the two-stage connection and the three-stage connection.

(10) In the power supply system according to the present invention, during regeneration, the controller turns on the bypass switch while the voltage between the pair of first terminals is 0. Thus, it is possible to prevent a large change in the system voltage during switching between the one-stage connection and the two-stage connection or during switching between the two-stage connection and the three-stage connection.

(11) In the power supply system according to the present invention, the first DC power supply includes the first battery and the first battery switch connected in series to the third power line, the second DC power supply includes the second battery and the second battery switch connected in series to the fourth power line, and the controller turns on these first and second battery switches, and thus turns on the first and second DC power supplies. According to the present invention, the first battery can be charged when the variable voltage power supply and the first DC power supply are connected in series to the load during regeneration, and the first and second batteries can be charged when the variable voltage power supply, the first DC power supply, and the second. DC power supply are connected in series to the load during regeneration.

(12) In the power supply system according to the present invention, the first DC power supply is the isolated bidirectional DC/DC converter in which the primary-side circuit is connected to the main battery and the secondary-side circuit is connected to the third power line, the second DC power supply is the isolated bidirectional DC/DC converter in which the primary-side circuit is connected to the main battery and the secondary-side circuit is connected to the fourth power line, and the controller turns on the first and second DC power supplies by driving the primary-side circuit and/or the secondary-side circuit. According to the present invention, the main battery can be charged with the power that is transformed by the first DC power supply when the variable voltage power supply and the first DC power supply are connected in series to the load during regeneration, and the main battery can be charged with the power that is transformed by the first and second DC power supplies when the variable voltage power supply, the first DC power supply, and the second DC power supply are connected in series to the load during regeneration.

(13) The moving body according to the present invention includes the AC rotating electrical machine that generates the propulsive force and the U-phase power supply, the V-phase power supply, and the W-phase power supply that are the power supply system capable of being switching between the one-stage connection and the two-stage connection as described above. In the present invention, the U-phase power supply is connected to both ends of the U-phase leg connected to the U-phase of the AC rotating electrical machine, the V-phase power is connected to both ends of the V-phase leg connected to the V-phase of the AC rotating electrical machine, and the W-phase power supply is connected to both ends of the W-phase leg connected to the W-phase of the AC rotating electrical machine. According to the present invention, as in the invention according to (1) described above, since it is not necessary to increase the number of arm switches included in the legs of the respective phases when the voltage is increased in multiple stages, the switching loss and the steady loss in the legs of the respective phases can be reduced accordingly. Further, according to the present invention, as in the invention according to (1) described above, since the withstand voltage of the switches included in the power supplies of the respective phases can be lowered, the steady loss in the switches can be lowered, and the costs of the switches can also be reduced. Further, according to the present invention, as in the invention according to (1) described above, since it is not necessary to operate the arm switches included in the legs of the respective phases in order to change the voltage during the high-voltage application (during two-stage connection or during three-stage connection), the high frequency component of the voltage applied to the AC rotating electrical machine can be reduced, whereby the iron loss can also be reduced.

BRIEF DESCRIPTION OF THE DRAWINGS

FIG. 4 is a diagram showing a relationship between states of first and second switch units, a bypass switch unit, and first and second DC power supplies and a system voltage;

FIG. 3B is a diagram showing a second example of a rear-stage converter;

DETAILED DESCRIPTION OF THE INVENTION

First Embodiment

A power supply system according to a first embodiment of the present invention will be described below with reference to the drawings.

Figure 1:
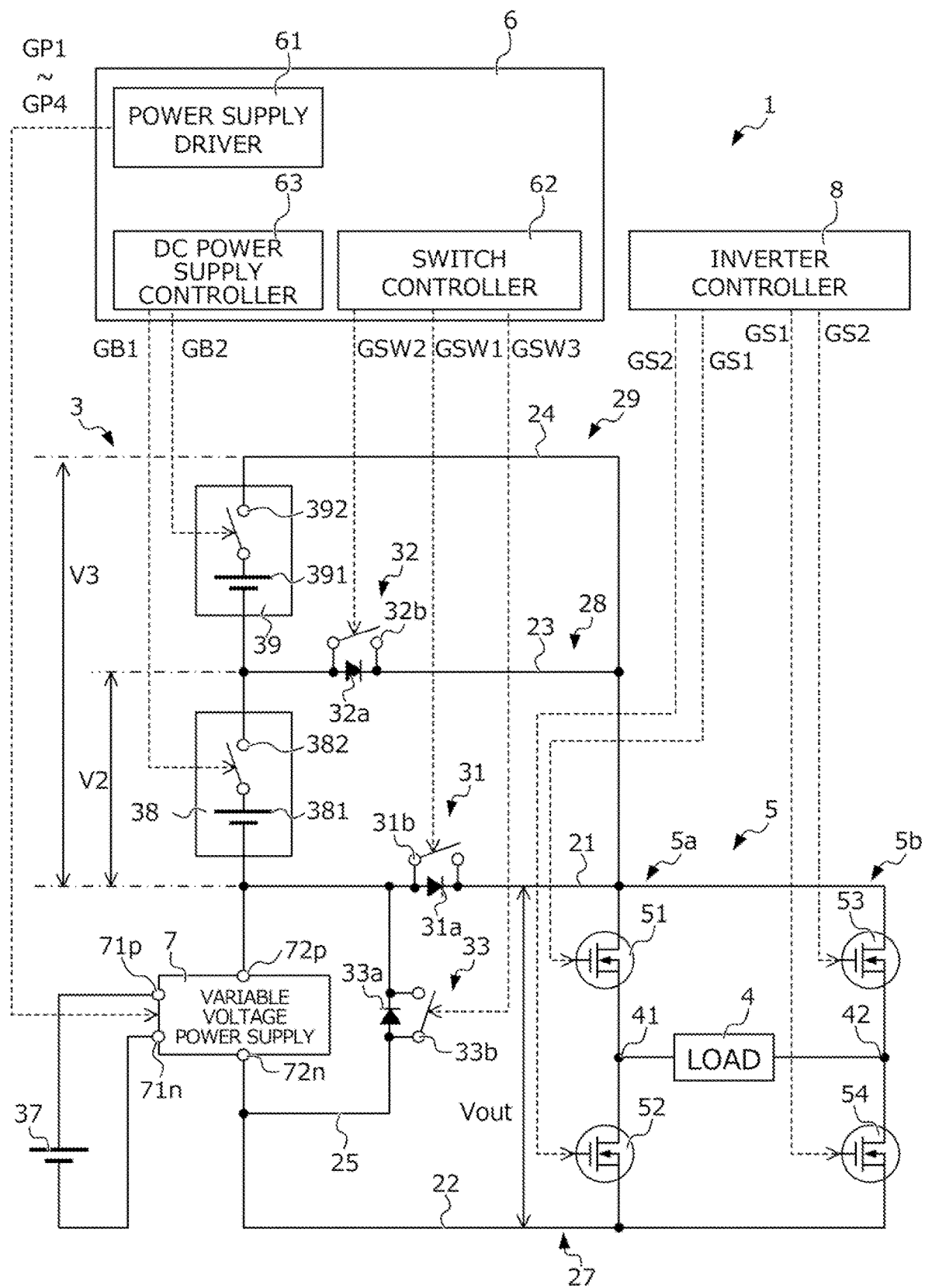
FIG. 1 is a diagram showing a circuit configuration of a power supply system according to a first embodiment of the present invention.

FIG. 1 is a diagram showing a circuit configuration of a power supply system 1 according to the present embodiment. The power supply system 1 includes a multi-stage voltage power supply 3 that outputs DC power of a multi-stage voltage to a first power line 21 and a second power line 22, an inverter circuit 5 that connects power lines 21 and 22 with a load 4, a multi-stage voltage power supply controller 6 that controls the multi-stage voltage power supply 3, and an inverter controller 8 that controls the inverter circuit 5. The power supply system 1 operates the multi-stage voltage power supply 3 and the inverter circuit 5 with the controllers 6 and 8 to convert the DC power output from the multi-stage voltage power supply 3 to the power lines 21 and 22 into AC power and supply it to the load 4, or to convert the AC power output from the load 4 into DC power and supply it to the multi-stage voltage power supply 3.

In the following description, a case will be described in which the load 4 is an AC rotating electrical machine that converts AC power supplied from the multi-stage voltage power supply 3 through the inverter circuit 5 into mechanical energy of a rotating shaft during power running, and that converts the mechanical energy of the rotating shaft into AC power and output it to the multi-stage voltage power supply 3 through the inverter circuit 5 during regeneration, but the present invention is not limited thereto.

The inverter circuit 5 includes two legs 5a and 5b that are used to connect the first power line 21 and the second power line 22. The a-phase leg 5a includes an a-phase upper arm switching element 51 and an a-phase lower arm switching element 52 that are connected in series from the first power line 21 toward the second power line 22 in this order. The b-phase leg 5b is connected to the power lines 21 and 22 so as to be in parallel with the a-phase leg 5a. The b-phase leg 5b includes a b-phase upper arm switching element 53 and a b-phase lower arm switching element 54 that are connected in series from the first power line 21 toward the second power line 22 in this order.

A first input/output terminal 41 of the load 4 is connected to a midpoint of the a-phase leg 5a, that is, a connection point between the a-phase upper arm switching element 51 and the a-phase lower arm switching element 52. In other words, the a-phase upper arm switching element 51 connects the first power line 21 and the first input/output terminal 41 of the load 4, and the a-phase lower arm switching element 52 connects the second power line 22 and the first input/output terminal 41 of the load 4. Further, a second input/output terminal 42 of the load 4 is connected to a midpoint of the b-phase leg 5b, that is, a connection point between the b-phase upper arm switching element 53 and the b-phase lower arm switching element 54. In other words, the b-phase upper arm switching element 53 connects the first power line 21 and the second input/output terminal 42 of the load 4, and the b-phase lower arm switching element 54 connects the second power line 22 and the second input/output terminal 42 of the load 4.

Each of these switching elements 51, 52, 53, and 54 is switched on or off according to on/off of a gate drive signal GS1 or GS2 input from the inverter controller 8. More specifically, the a-phase upper arm switching element 51 and the b-phase lower arm switching element 54 are switched on or off according to on/off of the gate drive signal GS1 input from the inverter controller 8, and the b-phase upper arm switching element 53 and the a-phase lower arm switching element 52 are switched on or off according to on/off of the gate drive signal GS2 input from the inverter controller 8. In the present embodiment, a case will be described in which an N-channel MOSFET including a body diode, which allows a current from a source to a drain, is used as these switching elements 51 to 54, but the present invention is not limited thereto. As these switching elements 51 to 54, a known switching element such as an IGET or a JFET may be used in addition to the MOSFET.

Further, as will be described below, these switching elements 51 to 54 do not necessary to perform switching control at the time of high-voltage output of the multi-stage voltage power supply 3.

Drains of the upper arm switching elements 51 and 53 are connected to the first power line 21, and sources of the upper arm switching elements 51 and 53 are connected to the first input/output terminal 41 and the second input/output terminal 42 of the load 4, respectively. Sources of the lower arm switching elements 52 and 54 are connected to the second power line 22, drains of the lower arm switching elements 52 and 54 are connected to the first input/output terminal 41 and the second input/output terminal 42 of the load 4, respectively. Thereby, the body diode of each of the switching elements 51 to 54 acts as a freewheeling diode.

The multi-stage voltage power supply 3 includes: a variable voltage power supply 7 that outputs DC power of a variable voltage that fluctuates in a predetermined cycle; a first power line 21 and a second power line 22 that connects the variable voltage power supply 7 and the load 4; a first switch unit 31 provided on the first power line 21; a third power line 23 that is connected to the first power line 21 so as to bypass the first switch unit 31; a first DC power supply 38 and a second switch unit 32 that are provided in series on the third power line 23; a fourth power line 24 that is connected to the third power line 23 so as to bypass the second switch unit 32; a second DC power supply 39 that is provided on the fourth power line 24; a bypass line 25 that connects the first power line 21 and the second power line 22 and bypasses the variable voltage power supply 7; a bypass switch unit 33 that is provided on the bypass line 25; and main battery 37. The multi-stage voltage power supply 3 is a four-level DC voltage power supply that can output DC voltages of four stages of 0 [V], E1 [V] (hereinafter, a variable voltage output from the variable voltage power supply 7 being referred to as E1), E1+E2 [V] (hereinafter, an output voltage of the first DC power supply 38 being referred to as E2), and E1+E2+E3 [V] (hereinafter, an output voltage of the second DC power supply 39 being referred to as E3), according to a circuit configuration to be described below.

The multi-stage voltage power supply controller 6 includes a power supply driver 61 that changes the variable voltage E1 from 0 to a predetermined maximum voltage by operating the variable voltage power supply 7, a switch controller 62 that controls switch units 31 to 33 based on a system voltage Vout which is a voltage between the power lines 21 and 22, and a DC power supply controller 63 that controls the DC power supplies 38 and 39 based on the system voltage Vout.

The main battery 37 is a secondary battery capable of performing both of discharging during which chemical energy is converted into electric energy and charging during which electric energy is converted into chemical energy.

The first DC power supply 38 includes a first battery 381 and a first battery switch 382 that are connected in series to the third power line 23. The first battery 381 is connected to the third power line 23 with a positive electrode on the load 4 and a negative electrode on the variable voltage power supply 7. When the first battery switch 382 is turned on, the first battery 381 outputs the DC power of the output voltage E2 to the third power line 23. The first battery 381 is a secondary battery capable of performing both of discharging during which chemical energy is converted into electric energy and charging during which electric energy is converted into chemical energy. The first battery switch 382 is switched on or off according to a gate drive signal GB1 input from the DC power supply controller 63. In the following description, a state in which the first battery switch 382 is turned on and the first battery 381 is connected to the third power line 23 may be referred as a state in which "the first DC power supply 38 is turned on", and a state in which the first battery switch 382 is turned off and the first battery 381 is disconnected from the third power line 23 may also be referred as a state in which "the first DC power supply 38 is turned off".

The second DC power supply 39 includes a second battery 391 and a second battery switch 392 that are connected in series to the fourth power line 24. The second battery 391 is connected to the fourth power line 24 with a positive electrode on the load 4 and a negative electrode on the variable voltage power supply 7. When the second battery switch 392 is turned on, the second battery 391 outputs the DC power of the output voltage E3 to the fourth power line 24. The second battery 391 is a secondary battery capable of performing both of discharging during which chemical energy is converted into electric energy and charging during which electric energy is converted into chemical energy. The second battery switch 392 is switched on or off according to a gate drive signal GB2 input from the DC power supply controller 63. In the following description, a state in which the second battery switch 392 is turned on and the second battery 391 is connected to the fourth power line 24 may be referred as a state in which "the second DC power supply 39 is turned on", and a state in which the second battery switch 392 is turned off and the second battery 391 is disconnected from the fourth power line 24 may also be referred as a state in which "the second DC power supply 39 is turned off".

The variable voltage power supply 7 includes, for example, a pair of primary-side input/output terminals $71p$ and $71n$ and a pair of secondary-side input/output terminals $72p$ and $72n$ that are isolated from each other, and an isolated bidirectional DC/DC converter is used that can bidirectionally input and output DC power between the pair of primary-side input/output terminals $71p$ and $71n$ and the pair of secondary-side input/output terminals $72p$ and $72n$. As shown in FIG. 1, the pair of secondary-side input/output terminals $72p$ and $72n$ of the variable voltage power supply 7 are connected to the first power line 21 and the second power line 22, respectively. Therefore, during power running of the load 4, the variable voltage power supply 7 transforms the DC power in the pair of primary-side input/output terminals $71p$ and $71n$ and outputs the power of the variable voltage E1 from the pair of secondary-side input/output terminals $72p$ and $72n$, and during regeneration of the load 4, the variable voltage power supply 7 transforms the DC power in the pair of secondary-side input/output terminals $72p$ and $72n$ and outputs the DC power from the pair of primary-side input/output terminals $71p$ and $71n$.

Further, as shown in FIG. 1, the pair of primary-side input/output terminals $71p$ and $71n$ of the variable voltage power supply 7 are connected to both positive and negative electrodes of the main battery 37. More specifically, the primary-side positive electrode input/output terminal $71p$ of the variable voltage power supply 7 is connected to the positive electrode of the main battery 37, and the primary-side negative electrode input/output terminal $71n$ of the variable voltage power supply 7 is connected to the negative electrode of the main battery 37. In the present embodiment, the case has been described in which the pair of primary-side input/output terminals $71p$ and $71n$ are connected to both the positive and negative electrodes of the DC power supply 30, but the present invention is not limited thereto. The pair of primary-side input/output terminals $71p$ and $71n$ of the variable voltage power supply 7 may be connected to both positive and negative electrodes of a DC power supply different from the main battery 37.

Figure 2:
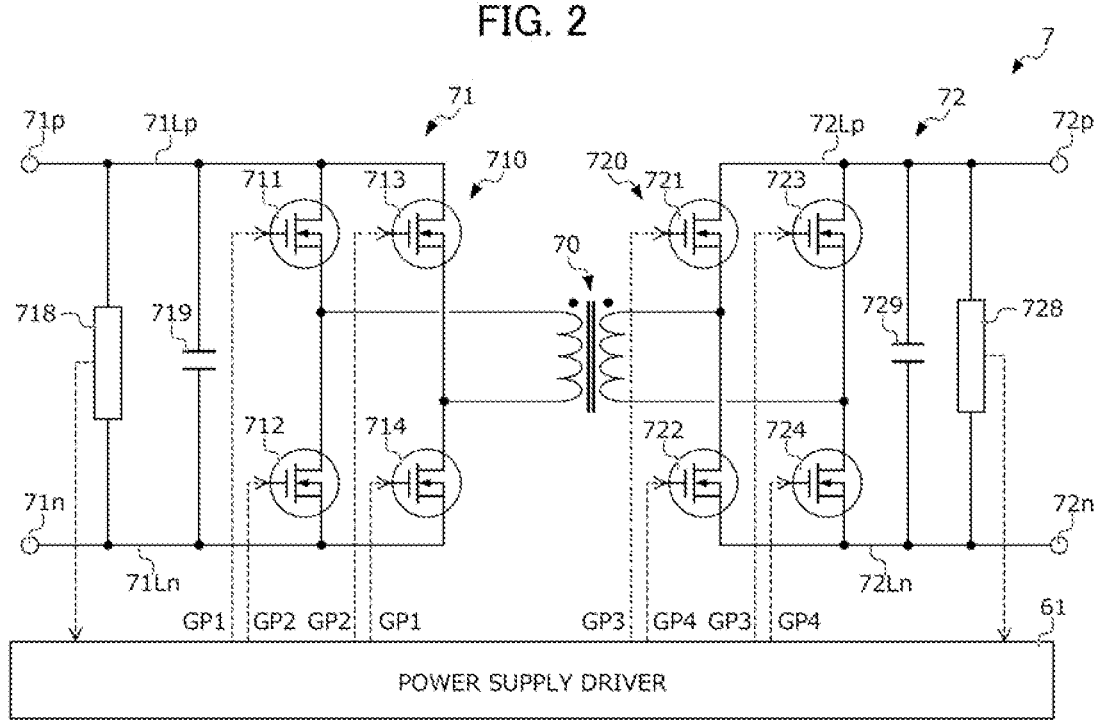
FIG. 2 is a diagram showing an example of a circuit configuration of a variable voltage power supply.

Next, a more detailed configuration of the variable voltage power supply 7 will be described with reference to FIG. 2. FIG. 2 is a diagram showing an example of the circuit configuration of the variable voltage power supply 7. FIG. 2 shows a case where the variable voltage power supply 7 is a so-called full bridge isolated bidirectional DC/DC converter. In the following description, a DC/DC converter of a voltage type will be described as an example, but the present invention is not limited thereto. The DC/DC converter may be a current type.

The variable voltage power supply 7 shown in FIG. 2 includes an insulation transformer 70 having a primary coil and a secondary coil, a primary-side circuit 71 in which the primary side of the insulation transformer 70 is connected to the pair of primary-side input/output terminals $71p$ and $71n$, and a secondary-side circuit 72 in which the secondary side of the insulation transformer 70 is connected to the pair of secondary-side input/output terminals $72p$ and $72n$.

The primary-side circuit 71 includes a positive electrode power line $71Lp$ connected to the primary-side positive electrode input/output terminal 71p, a negative electrode power line 71Ln connected to the primary-side negative electrode input/output terminal 71n, a primary-side full bridge circuit 710 in which these power lines 71Lp and 71Ln are connected to the primary coil of the insulation transformer. 70, and a primary-side voltage sensor 718 and a smoothing capacitor. 719 that are connected to each other in parallel between the positive electrode power line 71Lp and the negative electrode power line 71Ln. The primary-side voltage sensor 718 transmits a voltage detection signal corresponding to a voltage between the power lines 71Lp and 71Ln to the power supply driver 61.

The primary-side full bridge circuit 710 includes four switching elements 711, 712, 713, and 714 constituting the full bridge circuit on the primary side of the insulation transformer 70. Each of these switching elements 711 to 714 is switched on or off according to on/off of gate drive signals GP1 and GP2 input from the power supply driver 61. More specifically, the switching elements 711 and 714 are switched on or off according to on/off of the gate drive signal GP1 input from the power supply driver 61, and the switching elements 712 and 713 are switched on or off according to on/off of the gate drive signal GP2 input from the power supply driver 61. In the present embodiment, a case has been described in which an N-channel MOSFET including the body diode, which allows a current from a source to a drain, is used as the switching elements 711 to 714, but the present invention is not limited thereto. As these switching elements 711 to 714, a known switching element such as an IGBT or a JFET may be used in addition to the MOSFET.

Drains of the switching elements 711 and 713 are connected to the positive electrode power line 71Lp, and sources of the switching elements 711 and 713 are connected to both ends of the primary coil of the insulation transformer 70, respectively. Sources of the switching elements 712 and 714 are connected to the negative electrode power line 71Ln, and drains of the switching elements 712 and 714 are connected to both ends of the primary coil of the insulation transformer 70, respectively.

The secondary-side circuit 72 includes a positive electrode power line 72Lp connected to the secondary-side positive electrode input/output terminal 72p, a negative electrode power line 72Ln connected to the secondary-side negative electrode input/output terminal 72n, a secondary-side full bridge circuit 720 in which these power lines 72Lp and 72Ln are connected to the secondary coil of the insulation transformer 70, and a secondary-side voltage sensor 728 and a smoothing capacitor 729 that are connected to each other in parallel between the positive electrode power line 72Lp and the negative electrode power line 72Ln. The secondary-side voltage sensor 728 transmits a voltage detection signal corresponding to a voltage between the power lines 72Lp and 72Ln to the power supply driver 61.

The secondary-side full bridge circuit 720 includes four switching elements 721, 722, 723, and 724 constituting the full bridge circuit on the secondary side of the insulation transformer 70. Each of these switching elements 21 to 724 is switched on or off according to on/off of gate drive signals GP3 and GP4 input from the power supply driver 61. More specifically, the switching elements 721 and 724 are switched on or off according to on/off of the gate drive signal GP3 input from the power supply driver 61, and the switching elements 722 and 723 are switched on or off according to on/off of the gate drive signal GP4 input from the power supply driver 61. In the present embodiment, a case has been described in which an N-channel MOSFET including the body diode, which allows a current from a source to a drain, is used as the switching elements 721 to 724, but the present invention is not limited thereto. As these switching elements 721 to 724, a known switching element such as an IGBT or a JFET may be used in addition to the MOSFET.

Drains of the switching elements 721 and 723 are connected to the positive electrode power line 72Lp, and sources of the switching elements 721 and 723 are connected to both ends of the secondary coil of the insulation transformer 70, respectively. Sources of the switching elements 722 and 724 are connected to the negative electrode power line 72Ln, and drains of the switching elements 722 and 724 are connected to both ends of the secondary coil of the insulation transformer 70, respectively.

During power running of the load 4, the variable voltage power supply 7 as described above turns on/off the switching elements 711, 712, 713, and 714 of the primary-side circuit 71 by the gate drive signals GP1 and GP2 input from the power supply driver 61 and causes the secondary-side circuit 72 to operate as a rectifier circuit by the body diode of the switching elements 721, 722, 723, and 724, thereby transforming the DC power in the pair of primary-side input/output terminals 71p and 71n and outputting the power of the variable voltage E1 from the pair of secondary-side input/output terminals 72p and 72n. Further, during regeneration of the load 4, the variable voltage power supply 7 turns on/off the switching elements 721, 722, 723, and 724 of the secondary-side circuit 72 by the gate drive signals GP3 and GP4 input from the power supply driver 61 and causes the primary-side circuit 71 to operate as a rectifier circuit by the body diode of the switching elements 711, 712, 713, and 714, thereby transforming the DC power in the pair of secondary-side input/output terminals 72p and 72n and outputting the DC power from the pair of primary-side input/output terminals 71p and 71n.

Figure 3:
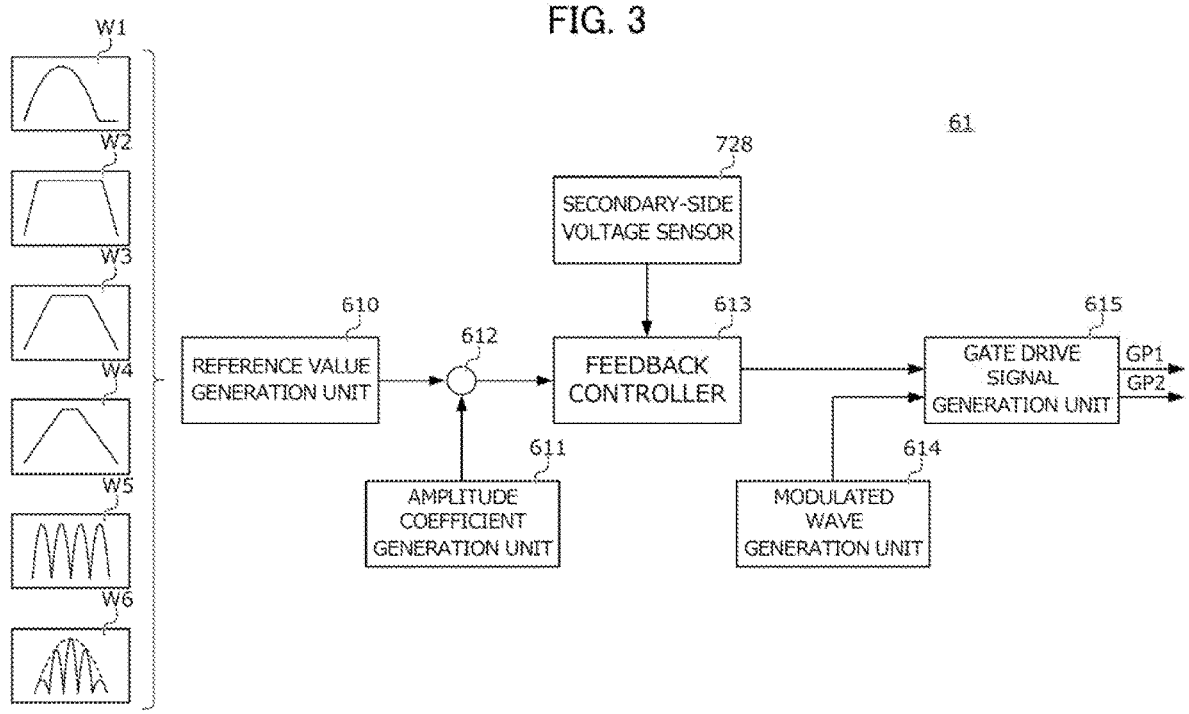
FIG. 3 is a functional block diagram showing a configuration of a power supply driver.

FIG. 3 is a functional block diagram showing a configuration of the power supply driver 61. More specifically, FIG. 3 shows only portions of the power supply driver 61, which operates the variable voltage power supply 7, related to the operation of the variable voltage power supply 7 during power running of the load 4 in particular.

The power supply driver 61 includes a reference value generation unit 610, an amplitude coefficient generation unit 611, a multiplication unit 612, a feedback controller 613, a modulated wave generation unit 614, and a gate drive signal generation unit 615. During power running of the load 4, the power supply driver 61 inputs the gate drive signals GP1 and GP2, which are generated using the reference value generation unit 610, the amplitude coefficient generation unit 611, the multiplication unit 612, the feedback controller 613, the modulated wave generation unit 614, and the gate drive signal generation unit 615, to the switching elements 711 to 714 of the primary-side circuit 71 of the variable voltage power supply 7, and operates these switching elements 711 to 714, thereby controlling a waveform of the variable voltage E1 output from the pair of secondary-side input/output terminals 72p and 72n.

The reference value generation unit 610 selects one of plurality of predetermined reference waveform profile data W1 to W6, calculates a control reference value based on the selected reference waveform profile data, and outputs the calculated control reference value to the multiplication unit 612. These reference waveform profile data W1 to W6 serve as a norm of the waveform of the variable voltage E1 output from the pair of secondary-side input/output terminals 72p and 72n during power running of the load 4.

The amplitude coefficient generation unit 611 outputs a preset amplitude coefficient to the multiplication unit 612.

The amplitude coefficient is a coefficient that is used to determine an amplitude of the variable voltage E1, that is, the maximum value of the variable voltage E1, and is determined between 0 to 1.

The multiplication unit 612 multiplies the control reference value output from the reference value generation unit 610 by the amplitude coefficient output from the amplitude coefficient generation unit 611 to calculate a target value of the variable voltage E1, and outputs the target value to the feedback controller 613.

The feedback controller 613 generates a correction signal according to a known feedback control algorithm (for example, a PID control rule) such that there is no deviation between the voltage value detected by the secondary-side voltage sensor 728 and the target value output from the multiplication unit 612, and outputs the correction signal to the gate drive signal generation unit 615.

The modulated wave generation unit 614 generates a modulated wave signal according to known modulated wave generation algorithms (for example, a PWM modulation algorithm, a PDM modulation algorithm, and a Δ-Σ modulation algorithm), and outputs the modulated wave signal to the gate drive signal generation unit 615.

The gate drive signal generation unit 615 generates, based on a comparison between the correction signal output from the feedback controller 613 and the modulated wave signal output from the modulated wave generation unit 614, the gate drive signal GP1 and the gate drive signal GP2, and inputs the generated signals to the switching elements 711 to 714, wherein the gate drive signal GP1 is used for driving the switching elements 711 and 714 of the primary-side circuit 71, and the gate drive signal GP2 is the gate drive signal for driving the switching elements 712 and 713 of the primary-side circuit 71 and has on/off inverted to that of the gate drive signal GP1.

The power supply driver 61 generates the gate drive signals GP1 and GP2 according to the procedure described above during power running of the load 4, and outputs the variable voltage E1 of the waveform selected by the reference value generation unit 610 from the pair of secondary-side input/output terminals 72p and 72n.

Next, returning to FIG. 1, the first power line 21 is provided with the first switch unit 31. The first switch unit 31 includes a first diode 31a and a first switch 31b that are connected to the first power line 21 in parallel. The first diode 31a allows the output current of the variable voltage power supply 7 and cuts off a current in a direction opposite to the output current. The first switch 31b is switched on or off according to a gate drive signal GSW1 input from the switch controller 62. In FIG. 1, the first diode 31a and the first switch 31b constituting the first switch unit 31 are shown as separate circuit elements for ease of understanding, but the present invention is not limited thereto. The first switch unit 31 may be replaced with a known switching element such as an MOSFET, an IGBT, or a JFET including a body diode.

The third power line 23 is connected to both ends of the first switch unit 31. More specifically, one end side of the third power line 23 is connected to the first power line 21 between the first switch unit 31 and the variable voltage power supply 7, and the other end side of the third power line 23 is connected to the first power line 21 closer to the load 4 than the first switch unit 31.

The first DC power supply 38 and the second switch unit 32 are connected in series to the third power line 23 in order from the variable voltage power supply 7 toward the load 4. More specifically, the second switch unit 32 is connected to the third power line 23 closer to the positive electrode of the first DC power supply 38. The second switch unit 32 includes a second diode 23a and a second switch 23b that are connected in parallel to the third power line 23. The second diode 32a allows an output current of the first DC power supply 38 and cuts off a current reverse to the output current. The second switch 32b is switched on or off according to a gate drive signal GSW2 input from the switch controller 62. In FIG. 1, the second diode 32a and the second switch 32b constituting the second switch unit 32 are shown as separate circuit elements for ease of understanding, but the present invention is not limited thereto. The second switch unit 32 may be replaced with a known switching element as in the first switch unit 31.

The fourth power line 24 connects both ends of the second switch unit 32 on the third power line 23. More specifically, one end side of the fourth power line 24 is connected to the third power line 23 between the second switch unit 32 and the first DC power supply 38, and the other end side of the fourth power line 24 is connected to the third power line 23 closer to the load 4 than the second switch unit 32. The fourth power line 24 is provided with the second DC power supply 39.

The bypass line 25 connects the pair of secondary-side input/output terminals 72p and 72n of the variable voltage power supply 7. The bypass switch unit 33 is provided on the bypass line 25. The bypass switch unit 33 includes a bypass diode 33a and a bypass switch 33b that are connected in parallel to the bypass line 25. The bypass diode 33a allows the output current of the first DC power supply 38 and cuts off the current reverse to the output current. The bypass switch 33b is switched on or off according to a gate drive signal GSW3 input from the switch controller 62. In FIG. 1, the bypass diode 33a and the bypass switch 33b constituting the bypass switch unit 33 are shown as separate circuit elements for ease of understanding, but the present invention is not limited thereto. The bypass switch unit 33 may be replaced with a known switching elements such as an MOSFET, an IGBT, and a JFET including a body diode.

In the following description, the variable voltage power supply 7, the first power line 21, the second power line 22, and the bypass line 25 connected to the variable voltage power supply 7, the first switch unit 31 provided on the first power line 21, and the bypass switch unit 33 provided on the bypass line 25 are collectively referred to as a bottom unit 27 in the circuit constituting the multi-stage voltage power supply 3. Further, the first DC power supply 38, the third power line 23 connecting the first. DC power supply 38 to the bottom unit 27 in a lower stage, and the second switch unit 32 provided on the third power line 23 are collectively also referred to as a middle unit 28. In addition, the second DC power supply 39 and the fourth power line 24 connecting the second DC power supply 39 to the middle unit 28 in a lower stage are collectively also referred to as a top unit 29.

Next, a procedure for controlling the switch units 31 to 33, the DC power supplies 38 and 39, and variable voltage E1 by the multi-stage voltage power supply controller 6 will be described with reference to FIGS. 4 to 6.

FIG. 4 is a table showing a relationship between states of the switch units 31 to 33 and the DC power supplies 38 and 39 and the system voltage Vout. In FIG. 5, "Di" indicates a state in which a current is flowing through the diodes included in the switch units 31 to 33.

Figure 5:
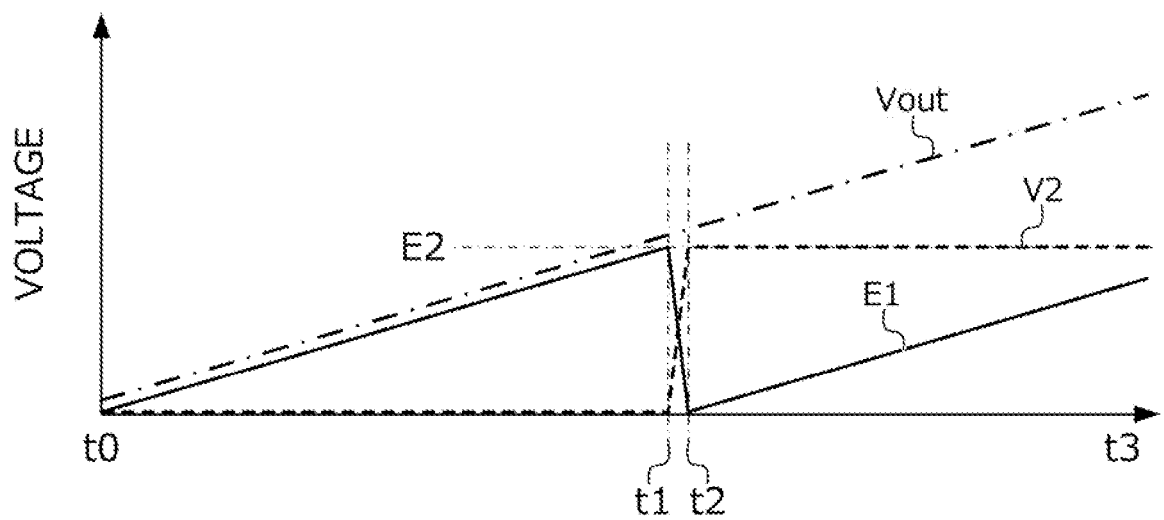
FIG. 5 is a diagram showing an example of time changes of a variable voltage, a voltage at both ends of the first DC power supply, and a system voltage.

FIG. 5 is a diagram showing an example of time changes of the variable voltage E1 (solid line), a voltage V2 (broken line) at both ends of the first DC power supply 38, and the system voltage Vout (dashed-dotted line). FIG. 6 is a diagram showing an example of time changes of the variable voltage E1 (solid line), a voltage V3 (broken line) at both ends of the first DC power supply 38 and the second DC power supply 39, and the system voltage Vout (dashed-dotted line). Note that FIGS. 5 and 6 show the system voltage Vout offset slightly upward for ease of understanding.

During power running in which the power in the power lines 21 and 22 is supplied to the load 4, the controllers 62 and 63 turn off the second switch unit 32, the bypass switch unit 33, the first DC power supply 38, and the second DC power supply 39 (see FIG. 4) when changing the system voltage Vout in a range less than the output voltage E2 of the first DC power supply 38 (see a time between t0 and t1 in FIG. 5). Thus, the DC power supplies 38 and 39 are disconnected from the load 4, and only the variable voltage power supply 7 is connected to the load 4 (one-stage connection). Accordingly, in this case, the variable voltage E1 of the variable voltage power supply 7 is changed in a range of 0 to E2 by the power supply driver 61, whereby the system voltage Vout can be changed in a range of 0 to E2.

Figure 6:
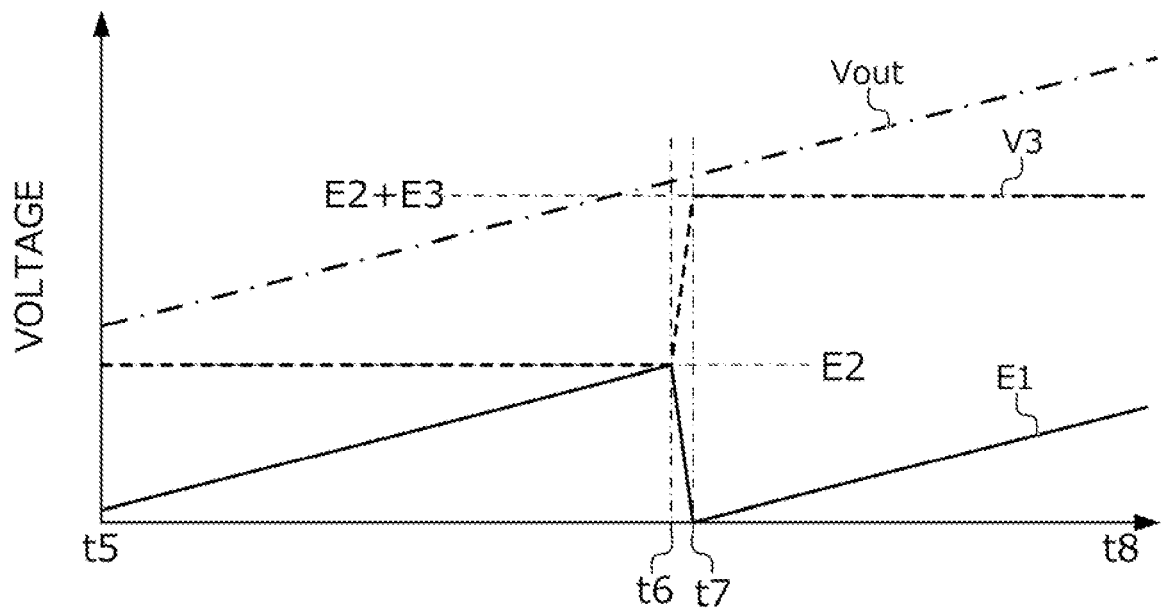
FIG. 6 is a diagram showing an example of time changes of the variable voltage, the voltage at both ends of the first DC power supply, a voltage at both ends of the second DC power supply, and the system voltage.

During power running, the controllers 62 and 63 turn on the first DC power supply 38 and turn off the first switch unit 31 and the second DC power supply 39 (see FIG. 4) when changing the system voltage Vout in a range larger than the output voltage E2 and less than a sum of the output voltage E3 and the output voltage E2 of the second DC power supply 39 (see a time between t2 and t3 in FIG. 5, and a time between t5 and t6 in FIG. 6). Thus, the second DC power supply 39 is disconnected from the load 4, and the variable voltage power supply 7 and the first DC power supply 38 are connected in series to the load 4 (two-stage connection). Accordingly, in this case, the variable voltage E1 of the variable voltage power supply 7 is changed in a range of 0 to E3 by the power supply driver 61, whereby the system voltage Vout can be changed in a range of E2 to E2+E3.

During power running, the controllers 62 and 63 turn on the first DC power supply 38 and the second DC power supply 39 and turn off the first switch unit 31, the second switch unit 32, and the bypass switch unit 33 (see FIG. 4) when changing the system voltage Vout in a range larger than E2+E3 (see a time between t7 and t8 in FIG. 6). Thus, the variable voltage power supply 7, the first DC power supply 38, and the second DC power supply 39 are connected in series to the load 4 (three-stage connection). Accordingly, in this case, the variable voltage E1 of the variable voltage power supply 7 is changed in a range of 0 to a maximum voltage E1max by the power supply driver 61, whereby the system voltage Vout can be changed in a range of E24-E3 to E2+E3+E1max.

During power running, the controllers 62 and 63 switch the first DC power supply 38 from off to on before the variable voltage E1 becomes 0 at the time t2 when raising the system voltage Vout across the output voltage E2 of the first DC power supply 38 (see time t1→t2 in FIG. 5), and switch the first DC power supply 38 from on to off before the variable voltage E1 becomes E2 at the time t1 when lowering the system voltage Vout across the output voltage E2 (see time t2→t1 in FIG. 5). Thus, as shown in FIG. 5, it is possible to prevent disturbance of the system voltage Vout while the variable voltage E1 changes from 0 to E2 between the time t1 and the time t2.

During power running, the controllers 62 and 63 switch the second DC power supply 39 from off to on before the variable voltage E1 becomes 0 at the time t7 when raising the system voltage vout across the output voltage E2+E3 (see time t6→t7 in FIG. 6), and switch the second DC power supply 39 from on to off before the variable voltage E1 becomes E3 at the time t6 when lowering the system voltage Vout across the output voltage E2+E3 (see time t7→t6 in FIG. 6). Thus, as shown in FIG. 6, it is possible to prevent disturbance of the system voltage Vout while the variable voltage E1 changes from 0 to E3 between the time t6 and the time t7.

During regeneration in which the power in the load 4 is supplied to the power lines 21 and 22, the controllers 62 and 63 turn on the first switch unit 31 and turn off the second switch unit 32, the bypass switch 33, the first DC power supply 38, and the second DC power supply 39 (see FIG. 4) when changing the system voltage Vout in a range less than the output voltage E2 (see time between t0 and t1 in FIG. 5). Thus, the DC power supplies 38 and 39 are disconnected from the load 4, and only the variable voltage power supply 7 is connected to the load 4 (one-stage connection). Accordingly, in this case, the variable voltage E1 of the variable voltage power supply 7 is changed in a range of 0 to E2 by the power supply driver 61, whereby the system voltage Vout can be changed in a range of 0 to E2. At this time, the power supply driver 61 operates the variable voltage power supply 7 to transform the power in the pair of secondary-side input/output terminals 72p and 72n and to output the power from the pair of primary-side input/output terminals 71p and 71n, whereby the main battery 37 can be charged with the power supplied from the load 4.

During regeneration, the controllers 62 and 63 turn on the second switch unit 32 and the first DC power supply 38 and turn off the first switch unit 31, the bypass switch unit 33, and the second DC power supply 39 (see FIG. 4) when changing the system voltage Vout in a range larger than the output voltage E2 and less than the output voltage E2+E3 (see a time between t2 and t3 in FIG. 5, and a time between t5 and t6 in FIG. 6). Thus, the second DC power supply 39 is disconnected from the load 4, and the variable voltage power supply 7 and the first DC power supply 38 are connected in series to the load 4 (two-stage connection). Accordingly, in this case, the first battery 381 of the first DC power supply 38 is charged with the power supplied from the load 4. Accordingly, in this case, the variable voltage E1 of the variable voltage power supply 7 is changed in the range of 0 to E3 by the power supply driver 61, whereby the system voltage Vout can be changed in the range of E2 to E24-E3. At this time, the power supply driver 61 operates the variable voltage power supply 7 to transform the power in the pair of secondary-side input/output terminals 72p and 72n and to output the power from the pair of primary-side input/output terminals 71p and 71n, whereby the main battery 37 can be charged with the power supplied from the load 4.

During regeneration, the controllers 62 and 63 turn on the first DC power supply 38 and the second DC power supply 39 and turn off the first switch unit 31, the second switch unit 32, and the bypass switch unit 33 (see FIG. 4) when changing the system voltage Vout in the range larger than E2+E3 (see a time between t7 and t8 in FIG. 6). Thus, the variable voltage power supply 7, the first DC power supply 38, and the second DC power supply 39 are connected in series to the load 4 (three-stage connection). Accordingly, in this case, the first battery 381 of the first DC power supply 38 and the second battery 391 of the second DC power supply 39 are charged with the power supplied from the load 4. In this case, the variable voltage E1 of the variable voltage power supply 7 is changed in the range of 0 to E1max by the power supply driver 61, whereby the system voltage Vout can be changed in the range larger than E2+E3. At this time, the power supply driver 61 operates the variable voltage power supply 7 to transform the power in the pair of secondary-side input/output terminals 72p and 72n and to output the power from the pair of primary-side input/output terminals 71p and 71n, whereby the main battery 37 can be charged with the power supplied from the load 4.

During regeneration, the controllers 62 and 63 switch the first switch unit 31 from on to off and switch the first DC power supply 33-38 and the second switch unit 32 from off to on before the variable voltage E1 becomes 0 at the time t2 (see FIG. 4) when raising the system voltage Vout: across the output voltage E2 of the first DC power supply 38 (see time t1-t2 in FIG. 5). Further, during regeneration, the controllers 62 and 63 switch the first switch unit 31 from off to on and switch the first DC power supply 38 and the second switch unit 32 from off to on before the variable voltage E1 becomes E2 at the time t1 (see FIG. 4) when lowering the system voltage Vout across the output voltage E2 (see time t2-t1 in FIG. 5). Thus, as shown in FIG. 5, it is possible to prevent disturbance of the system voltage Vout while the variable voltage E1 changes from 0 to E2 between the time t1 and the time t2. Further, at this time, preferably, the controllers 62 and 63 turn on the bypass switch unit 33 while the variable voltage E1 is 0, and thus ensure the connection between the first DC power supply 38 and the load 4.

During regeneration, the controllers 62 and 63 switch the first switch unit 31 from on to off and switch the first DC power supply 38 and the second switch unit 32 from off to on before the variable voltage E1 becomes 0 at the time t2 (see FIG. 4) when raising the system voltage rout across the output voltage E2 of the first DC power supply 38 (see time t1→t2 in FIG. 5). Further, during regeneration, the controllers 62 and 63 switch the first switch unit 31 from off to on and switch the first DC power supply 38 and the second switch unit 32 from off to on before the variable voltage E1 becomes E2 at the time t1 (see FIG. 4) when lowering the system voltage Vout across the output voltage E2 (see time t2→t1 in FIG. 5). Thus, as shown in FIG. 5, it is possible to prevent disturbance of the system voltage Vout while the variable voltage E1 changes from 0 to E2 between the time t1 and the time t2. Further, at this time, preferably, the controllers 62 and 63 turn on the bypass switch unit 33 while the variable voltage E1 is 0, and thus ensure the connection between the first DC power supply 38 and the load 4.

During regeneration, the controllers 62 and 63 switch the second switch unit 32 from on to off and switch the second DC power supply 39 from off to on before the variable voltage E1 becomes 0 at the time t7 (see FIG. 4) when raising the system voltage Vout across the output voltage E2+E3 (see time t6→t7 in FIG. 6). Further, during regeneration, the controllers 62 and 63 switch the second switch unit 32 from off to on and switch the second DC power supply 39 from on to off before the variable voltage E1 becomes the output voltage E3 at the time t6 (see FIG. 4) when lowering the system voltage Vout across the output voltage E2-E3 (see time t7→t6 in FIG. 6). Thus, as shown in FIG. 6, it is possible to prevent disturbance of the system voltage Vout while the variable voltage E1 changes from 0 to E3 between the time t6 and the time t7. Further, at this time, preferably, the controllers 62 and 63 turn on the bypass switch unit. 33 while the variable voltage E1 is 0, and thus ensure the connection between the DC power supplies 38 and 39 and the load 4.

According to the power supply system 1 of the present embodiment, the following effects are obtained.

(1) The power supply system 1 includes the variable voltage power supply 7, the power lines 21 and 22 that connect the pair of secondary-side input/output terminals 72p and 72n of the variable voltage power supply 7 and the load 4, the first switch unit 31 provided on the first power line 21, the third power line 23 that is connected to the first power line 21 so as to bypass the first switch unit 31, and the first DC power supply 38 that is connected to the third power line 23. According to the power supply system 1, when the system voltage Vout, which is the voltage between the power lines 21 and 22, is changed in the range less than the output voltage E2 of the first DC power supply 38 (when a low voltage is applied), the first switch unit 31 is turned on, whereby the system voltage Vout can be changed only by the output of the variable voltage power supply 7. Further, according to the power supply system 1, when the system voltage Vout is changed in the range larger than the output voltage E2 (when a high voltage is applied), the first switch unit. 31 is turned off, and the variable voltage E1 of the variable voltage power supply 7 is superimposed on the output voltage E2 of the first DC power supply 38, whereby the system voltage Vout can be changed in the range larger than the output voltage E2. Therefore, according to the power supply system 1, since it is not necessary to operate the switch of the inverter circuit 5 in order to change the voltage applied to the load 4 both when the low voltage is applied and when the high voltage is applied, it is not necessary to increase the number of switches in a case of making the voltage multiple stages. For this reason, it is possible to reduce the number of switches as compared with the case of making the voltage multiple stages by the multi-stage DC chopper circuit as disclosed in Patent Document 1, for example, and thus it is possible to reduce switching loss and steady loss to that extent.

Further, according to the power supply system 1, as described above, it is not necessary to operate the switch of the inverter circuit 5 to change the voltage during the high-voltage application, and thus it is not necessary to consider a surge voltage during the high-voltage application in a case of designing the withstand voltage of the switch included in the power supply system 1. Therefore, according to the power supply system 1, it is possible to lower the withstand voltage of the switch included in the multi-stage voltage power supply 3 as compared with the case of making the voltage multiple stages by the multi-stage DC chopper circuit as disclosed in Patent Document 1, for example, and thus it is possible to reduce steady loss in the switch and to further reduce costs of the switch.

Further, according to the power supply system 1, as described above, it is not necessary to operate the inverter circuit 5 to change the voltage during the high-voltage application, and thus a high frequency component of the voltage applied to the load 4 can be reduced, whereby it is also possible to reduce iron loss.

The power supply system 1 includes the bypass line 25 that connects the pair of secondary-side input/output terminals 72p and 72n of the variable voltage power supply 7, and the bypass diode 33a provided on the bypass line 25, the bypass diode 33a allows the output current of the first DC power supply 38 and cuts off the current reverse to the output current. Therefore, according to the power supply system 1, the variable voltage E1 of the variable voltage power supply 7 can be changed within a predetermined range including 0 while the first DC power supply 38 and the variable voltage power supply 7 are connected in series to the load 4, and thus controllability of the system voltage Vout is excellent.

(2) The power supply system 1 includes the second switch unit 32 provided on the third power line 23, the fourth power line 24 that connects both ends of the second switch unit 32, and the second DC power supply 39 provided on the fourth power line 24. According to the power supply system 1, the variable voltage power supply 7 can be connected to the load 4 (one-stage connection) when the first switch unit 31 is turned on, the variable voltage power supply 7 and the first DC power supply 38 can be connected in series to the load 4 (two-stage connection) when the first switch unit 31 is turned off and the first DC power supply 38 is turned on, and the variable voltage power supply 7, the first DC power supply 38, and the second DC power supply 39 can be connected in series to the load 4 (three-stage connection) when the first switch unit 31 and the second switch unit 32 are turned off and the DC power supplies 38 and 39 are turned on.

(3) In the power supply system 1, the first switch unit 31 is connected to the first power line 21 in a state in which the first diode 31a and the first switch 31b are combined in parallel, the bypass switch unit 33 is connected to the bypass line 25 in a state in which the bypass diode 33a and the bypass switch 33b are combined in parallel, and the second switch unit 32 is connected to the third power line 23 in a state in which the second diode 32a and the second switch 32b are combined in parallel. According to the power supply system 1, it is possible to prevent the current from flowing in an unintended direction during power running and during regeneration.

(4) The power supply system 1 includes the power supply driver 61 that changes the voltage between the pair of secondary-side input/output terminals 72p and 72n from 0 to a predetermined maximum voltage by operating the variable voltage power supply 7. According to the power supply system 1, it is possible to shape the waveform of the variable voltage E1 of the power output from the variable voltage power supply 7 by the power supply driver 61 into a preferred waveform, and thus it is possible to supply the AC power having the preferred waveform without operating the multi stage voltage power supply 3 and the switch included in the inverter circuit 5 connected between the multi-stage voltage power supply 3 and the load 4 while the variable voltage E1 is applied to the load 4.

(5) According to the power supply system 1, the controllers 62 and 63 can switch the power circuit formed by the power supply system 1 among the one-stage connection, the two-stage connection, and the three-stage connection at an appropriate timing such that the system voltage Vout is not disturbed, by controlling the switch units 31 to 33, and the DC power supplies 38 and 31 based on the system voltage Vout.

(6) In the power supply system 1, the controllers 62 and 63 turn off the second switch unit 32, the bypass switch unit 33, and the DC power supplies 38 and 39 during power running when changing the system voltage Vout in the range less than the output voltage E2, whereby only the variable voltage power supply 7 can be connected to the load 4 (that is, the one-stage connection), and the power output from the variable voltage power supply 7 can be supplied to the load 4. The controllers 62 and 63 turn on the first DC power supply 38 and turn off the first switch unit 31, the bypass switch unit 33, and the second DC power supply 39 during power running when changing the system voltage Vout in the range larger than the output voltage E2 and less than the output voltage E2+E3, whereby the variable voltage power supply 7 and the first DC power supply 38 are connected in series to the load 4 (that is, two-stage connection), and the power output from the variable voltage power supply 7 and the first DC power supply 38 can be supplied to the load 4. In addition, the controllers 62 and 63 turn on the DC power supplies 38 and 39 and turn off the switch unit 31 to 33 during power running when changing the system voltage Vout in the range larger than the output voltage E24-E3, whereby the variable voltage power supply 7, the first DC power supply 38, and the second DC power supply 39 are connected in series to the load 4 (that is, three-stage connection), and the power output from the variable voltage power supply 7, the first DC power supply 38, and the second DC power supply 39 can be supplied to the load 4.

(7) In the power supply system 1, the controllers 62 and 63 switch the first DC power supply 38 on or off during power running before the voltage E1 between the pair of secondary-side input/output terminals 72p and 72n becomes 0 or the output voltage E2 when raising or lowering the system voltage Tout across the output voltage E2, whereby it is possible to prevent a large change in the system voltage Vout during switching between the one-stage connection and the two-stage connection. Further, the controllers 62 and 63 switch the second DC power supply 39 on or off during power running before the voltage E1 between the pair of secondary-side input/output terminals 72p and 72n becomes 0 or the output voltage 3 when raising or lowering the system voltage Vout across the output voltage 2+E3, whereby it is possible to prevent a large change in the system voltage Vout during switching between the two-stage connection and the three-stage connection.

(8) In the power supply system 1, the controllers 62 and 63 turn on the first switch unit 31 and turn off the second switch unit 32, the bypass switch unit 33, and the DC power supplies 38 and 39 during regeneration when changing the system voltage Vout in the range less than the output voltage E2, whereby only the variable voltage power supply 7 can be connected to the load 4 (that is, one-stage connection), and the regenerative power can be supplied to the variable voltage power supply 7. The controllers 62 and 63 turn on the second switch unit 32 and the first DC power supply 38 and turn off the first switch unit 31, the bypass switch unit 33, and the second DC power supply 39 during regeneration when changing the system voltage Vout in the range larger than the output voltage E2 and less than the output voltage E2+E3, whereby the variable voltage power supply 7 and the first DC power supply 38 are connected in series to the load 4 (that is, two-stage connection), and the regenerative power can be divided to be supplied to the first DC power supply 38 and the variable voltage power supply 7. In addition, the controllers 62 and 63 turn on the DC power supplies 38 and 39 and turn off the switch units 31 to 33 during regeneration when changing the system voltage Vout in the range larger than the output voltage E2+E3, whereby the variable voltage power supply 7, and the DC power supplies 38 and 39 are connected in series to the load 4 (that is, three-stage connection), and the regenerative power can be divided to be supplied to the first DC power supply 38, the second DC power supply 39, and the variable voltage power supply 7.

(9) in the power supply system 1, during regeneration, the controllers 62 and 63 switch the first switch unit 31 from on to off and the first DC power supply 38 and the second switch unit 32 from off to on before the voltage E1 between the pair of secondary-side input/output terminals 72p and 72n becomes 0 when raising the system voltage Vout across the output voltage E2, and switch the first switch unit 31 from off to on and the first DC power supply 38 and the second switch unit 32 from on to off before the voltage E1 between the pair of secondary-side input/output terminals 72p and 72n becomes the output voltage E2 when lowering the system voltage Vout across the output voltage E2. Thus, it is possible to prevent a large change in the system voltage Vout during switching between the one-stage connection and the two-stage connection. Further, during regeneration, the controller 62 and 63 switch the second switch unit 32 from on to off and switches the second. DC power supply 39 from off to on before the voltage E1 between the pair of secondary-side input/output terminals 72p and 72n becomes 0 when raising the system voltage Vout across the output voltage E2+E3, and switch the second switch unit 32 from off to on and the second DC power supply 39 from on to off before the voltage E1 between the pair of secondary-side input/output terminals 72p and 72n becomes the output voltage E3 when lowering the system voltage Vout across the output voltage E2+E3. Thus, it is possible to prevent a large change in the system voltage Vout during switching between the two-stage connection and the three-stage connection.

(10) In the power supply system 1, during regeneration, the controllers 62 and 63 turn on the bypass switch unit 33 while the voltage E1 between the pair of secondary-side input/output terminals 72p and 72n is 0. Thus, it is possible to prevent a large change in the system voltage Vout during switching between the one-stage connection and the two-stage connection or during switching between the two-stage connection and the three-stage connection.

(11) In the power supply system 1, the first DC power supply 38 includes the first battery 381 and the first battery switch 382 connected in series to the third power line 23, the second DC power supply 39 includes the second battery 391 and the second battery switch 392 connected in series to the fourth power line 24, and the DC power supply controller 63 turns on these battery switches 382 and 392, and thus turns on the DC power supplies 38 and 39. According to the power supply system 1, the first battery 381 can be charged when the variable voltage power supply 7 and the first DC power supply 38 are connected in series to the load 4 during regeneration, and the batteries 381 and 391 can be charged when the variable voltage power supply 7, the first DC power supply 38, and the second DC power supply 39 are connected in series to the load 4 during regeneration.

In the embodiments described above, the multi-stage voltage power supply 3 is the four-level DC voltage power supply in which the bottom unit 27, the middle unit 28, and the top unit 29 are stacked to be capable of outputting DC voltages of four stages, but the number of stacked units is not limited thereto. For example, a three-level DC voltage power supply may be used in which the top unit is stacked on the bottom unit to be capable of outputting DC voltages of three stages. Further, a (n+3)—level DC voltage power supply may be used in which n-stage middle units (n is an integer of 2 or more) are stacked between the top unit and the bottom unit to be capable of outputting DC voltages of (n+3) stages.

Second Embodiment

Next, a power supply system according to a second embodiment of the present invention will be described with reference to the drawings. Further, in the following description of the power supply system according to the present embodiment, the same components as those of the power supply system 1 according to the first embodiment are denoted by the same reference numerals, and details thereof will not be described. The power supply system according to the present embodiment differs in a circuit configuration of the variable voltage power supply from that of the first embodiment.

Figure 7:
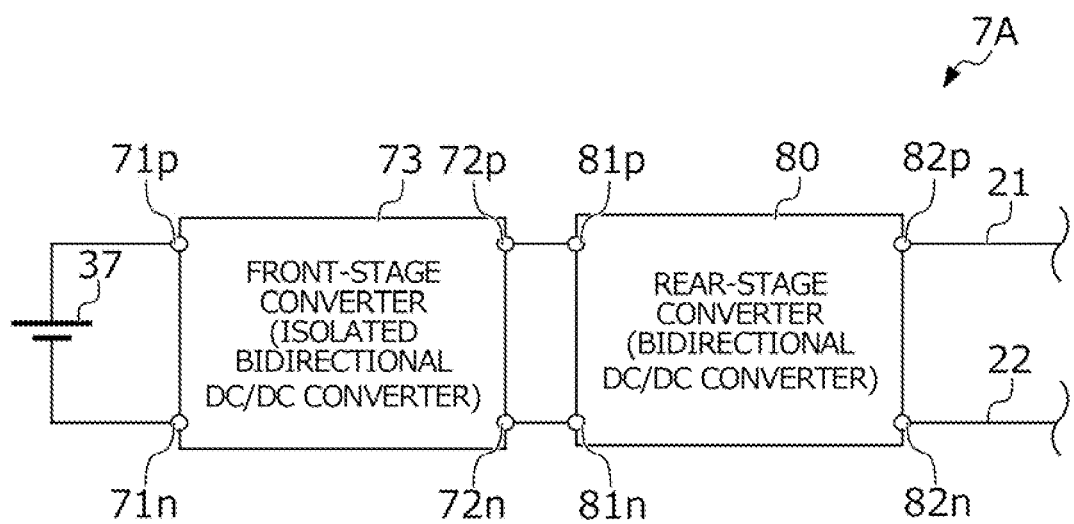
FIG. 7 is a diagram showing a circuit configuration of a variable voltage power supply of a power supply system according to a second embodiment of the present invention.

FIG. 7 is a diagram showing a circuit configuration of a variable voltage power supply 7A of the power supply system according to the present embodiment. The variable voltage power supply 7A includes a front-stage converter 73 and a rear-stage converter 80 which are combined in series in order from the main battery 37 to the power lines 21 and 22.

The front-stage converter 73 is an isolated bidirectional DC/DC converter including an insulation transformer (not shown), a primary-side circuit (not shown) that connects a primary side of the insulation transformer and the pair of primary-side input/output terminals 71p and 71n, and a secondary-side circuit. (not shown) that connects a secondary side of the insulation transformer and a pair of primary-side input/output terminals 81p and 81n of the rear-stage converter 80. Further, since the front-stage converter 73 has the same configuration as the variable voltage power supply 7 described with reference to FIG. 2, details thereof will not be described. As in the variable voltage power supply 7 according to the first embodiment, the pair of primary-side input/output terminals 71p and 71n of the front-stage converter 73 are connected to both positive and negative electrodes of the main battery 37. Further, as in the variable voltage power supply 7 according to the first embodiment, both pair of secondary-side input/output terminals 72p and 72n of the isolated bidirectional DC/DC converter 73 are connected to the first power line 21 and the second power line 22, respectively, through the rear-stage converter 80.

The rear-stage converter 80 is a bidirectional DC/DC converter including the pair of primary-side input/output terminals 81p and 81n connected to the pair of secondary-side input/output terminals 72p and 72n of the front-stage converter 73 and a pair of secondary-side input/output terminals 82p and 82n connected to the power lines 21 and 22, respectively, and capable of stepping up or down the DC power between the pair of primary-side input/output terminals 81p and 81n and the pair of secondary-side input/output terminals 82p and 82n to bidirectionally input and output the DC power.

Figure 8A:
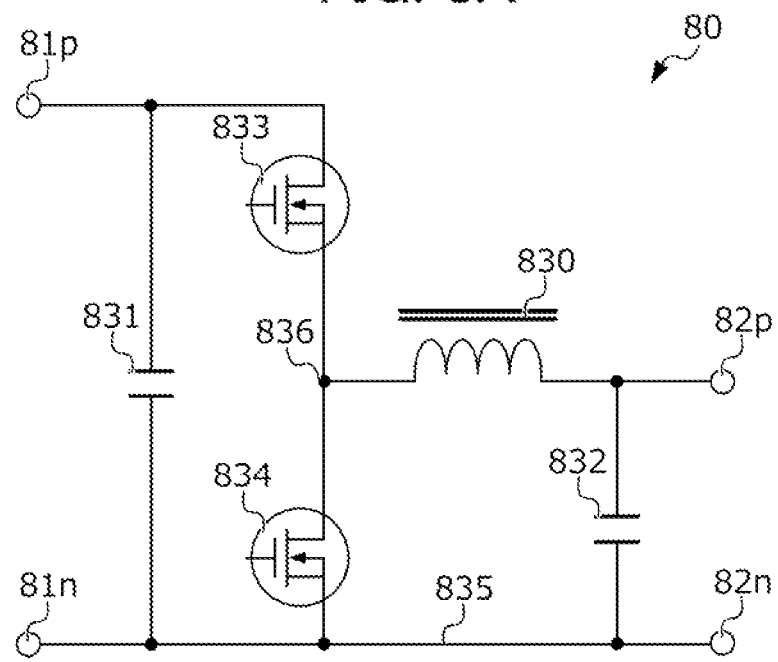
FIG. 8A is a diagram showing a first example of a rear-stage converter.

FIG. 8A is a diagram showing a first example of the rear-stage converter 80. The rear-stage converter 80 shown in FIG. 8A is a step-up/down chopper circuit configured by a combination of: a step-down chopper circuit that steps down the DC power input to the pair of primary-side input/output terminals 81p and 81n and outputs it to the pair of secondary-side input/output terminals 82p and 82n; and a step-up chopper circuit that steps up the DC power input to the pair of secondary-side input/output terminals 82p and 82n and outputs it to the pair of primary-side input/output terminals 81p and 81n.

The rear-stage converter 80 shown in FIG. 8A includes a reactor 830, a primary-side capacitor 831, a secondary-side capacitor 332, a first switching element 833, a second switching element 834, and a negative bus 835.

The negative bus 835 is a wiring for connecting the primary-side input/output terminal 81n and the secondary-side input/output terminal 82n. The reactor 830 has one end side connected to the secondary-side input/output terminal 82p and the other end side connected to a connection node 836 between the first switching element. 833 and the second switching element 834. The primary-side capacitor 831 has one end side connected to the primary-side input/output terminal 81p and the other end side connected to the negative bus 835. The secondary-side capacitor 832 has one end side connected to the secondary-side input/output terminal 82p and the other end side connected to the negative bus 835. For the switching elements 833 and 834, for example, an N-channel MOSFET is used as in the switching element 711 shown in FIG. 2. A drain of the first switching element 833 is connected to the primary-side input/output terminal 81$p$, and a source of the first switching element 833 is connected to the reactor 830. Further, a drain of the second switching element 834 is connected to the reactor 830, and a source of the second switching element 834 is connected to the negative bus 835.

According to the rear-stage converter 80 shown in FIG. 8A, switching of the switching elements 833 and 834 is controlled by a drive circuit (not shown), whereby the DC power in the pair of primary-side input/output terminals 81$p$ and 81$n$ can be stepped down to be output from the pair of secondary-side input/output terminals 82$p$ and 82$n$, and the DC power in the pair of secondary-side input/output terminals 82$p$ and 82$n$ can be stepped up to be output from the pair of primary-side input/output terminals 81$p$ and 81$n$.

Figure 8B:
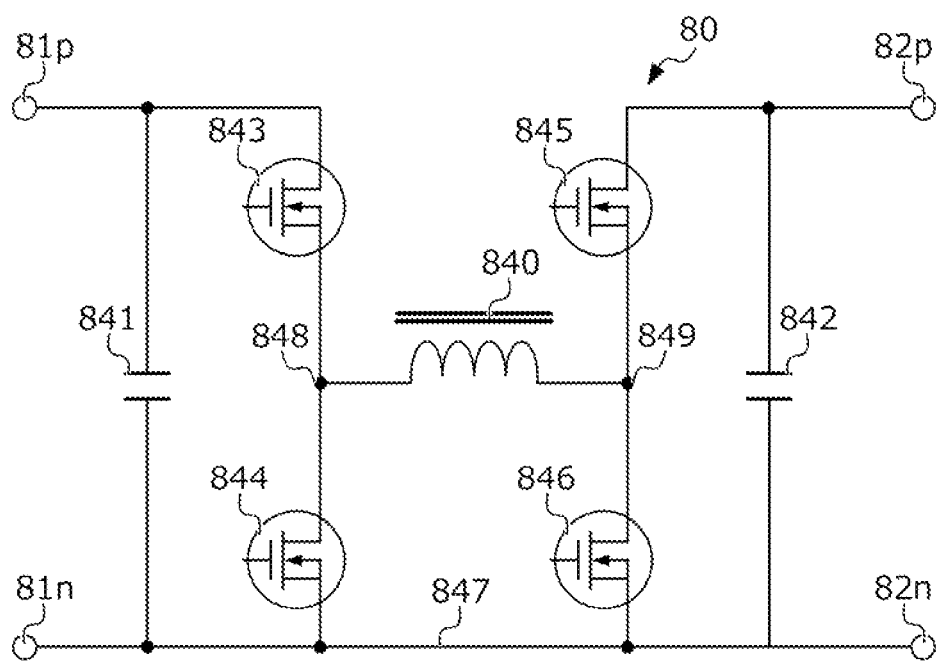

FIG. 8B is a diagram showing a second example of the rear-stage converter 80. The rear-stage converter 80 shown in FIG. 8B is a buck-boost converter configured by a combination of: a step-up/down chopper circuit that steps up and down the DC power input to the pair of primary-side input/output terminals 81$p$ and 81$n$ and outputs it to the pair of secondary-side input/output terminals 82$p$ and 82$n$; and a step-up/down chopper circuit that steps up and down the DC power input to the pair of secondary-side input/output terminals 82$p$ and 82$n$ and outputs it to the pair of primary-side input/output terminals 81$p$ and 81$n$.

The rear-stage converter. 80 shown in FIG. 8B includes a reactor 340, a primary-side capacitor 841, a secondary-side capacitor 842, a first switching element 843, a second switching element 844, a third switching element 845, a fourth switching element 346, and a negative bus 847.

The negative bus 847 is a wiring for connecting the primary-side input/output terminal 81$n$ and the secondary-side input/output terminal 82$n$. The reactor 840 has one end side connected to a connection node 848 between the first switching element 843 and the second switching element 844 and the other end side connected to a connection node 849 between the third switching element 845 and the fourth switching element 846. The primary-side capacitor 841 has one end side connected to the primary-side input/output terminal 81$p$ and the other end side connected to the negative bus 847. The secondary-side capacitor 842 has one end side connected to the secondary-side input/output terminal 82$p$ and the other end side connected to the negative bus 787. For the switching elements 843 to 846, for example, an N-channel MOSFET is used as in the switching element 711 shown in FIG. 2. A drain of the first switching element 843 is connected to the primary-side input/output terminal 81$p$, and a source of the first switching element 843 is connected to the reactor 840. A drain of the second switching element 844 is connected to the reactor 840, and a source of the second switching element 844 is connected to the negative bus 847. A drain of the third switching element 845 is connected to the secondary-side input/output terminal 82$p$, and a source of the third switching element 345 is connected to the reactor 840. Further, a drain of the fourth switching element 346 is connected to the reactor 340, and a source of the fourth switching element 846 is connected to the negative bus 847.

According to the rear-stage converter 80 shown in FIG. 88, switching of the switching elements 843 to 846 is controlled by a drive circuit (not shown), whereby the DC power in the pair of primary-side input/output terminals 81$p$ and 81$n$ can be stepped up and down to be output from the pair of secondary-side input/output terminals 82$p$ and 82$n$, and the DC power in the pair of secondary-side input/output terminals 82$p$ and 82$n$ can be stepped up and down to be output from the pair of primary-side input/output terminals 81$p$ and 81$n$.

According to the power supply system of the present embodiment, the following effects can be obtained in addition to the effects of (1) to (11) described above.

(12) In the first embodiment described above, the case has been described in which the isolated bidirectional DC/DC converter shown in FIG. 2 is used as the variable voltage power supply 7 and the pair of secondary-side input/output terminals 72$p$ and 72$n$ are directly connected to the positive electrode power line 21. However, in this case, the control range is limited during regeneration in which the DC power input to the pair of secondary-side input/output terminals 72$p$ and 72$n$ is transformed and is output from the pair of primary-side input/output terminals 71$p$ and 71$n$. On the other hand, in the present embodiment, the front-stage converter 73 serving as an isolated bidirectional DC/DC converter and the rear-stage converter 80 serving as a bidirectional DC/DC converter are combined to be used as the variable voltage power supply 7A. In other words, in the present embodiment, the front-stage converter 73 is connected to the power lines 21 and 22 through the rear-stage converter 80. Therefore, according to the present embodiment, since the rear-stage converter 80 can be driven and the DC power on the power lines 21 and 22 can be stepped up or stepped down as needed and supplied to the front-stage converter 73 during regeneration, it is possible to make the control range during regeneration equal to the control range during power running.

Third Embodiment

Next, a power supply system according to a third embodiment of the present invention will be described with reference to the drawings. Further, in the following description of the power supply system according to the present embodiment, the same components as those of the power supply system 1 according to the first embodiment are denoted by the same reference numerals, and details thereof will not be described.

Figure 9:
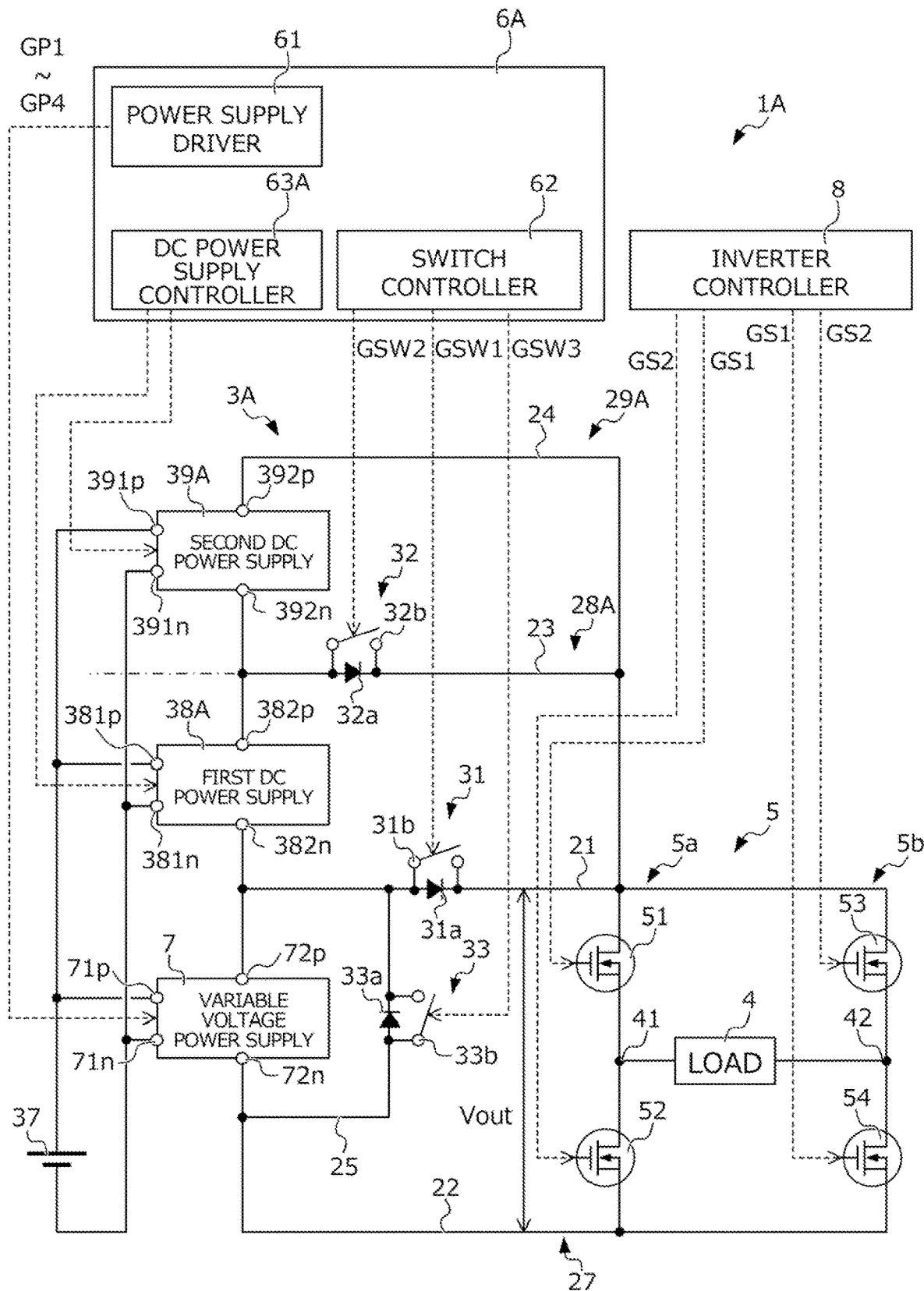
FIG. 9 is a diagram showing a circuit configuration of a power supply system according to a third embodiment of the present invention.

FIG. 9 is a diagram showing a circuit configuration of a power supply system 1A according to the present embodiment. The power supply system 1A according to the present embodiment differs from that of the first embodiment in terms of configurations of a multi-stage voltage power supply 3A and a multi-stage power supply controller 6A. More specifically, the power supply system 1A differs from the power supply system 1 according to the first embodiment in terms of a configuration of a first DC power supply 38A and a second DC power supply 39A of the multi-stage voltage power supply 3A and a configuration of a DC power supply controller 63A of the multi-stage voltage power supply controller 6A.

The first DC power supply 38A is an isolated bidirectional DC/DC converter that includes a primary-side circuit that is connected to a pair of primary-side input/output terminals 381$p$ and 381$n$ and a secondary-side circuit that is insulated from the primary-side circuit and is connected to a pair of secondary-side input/output terminals 382$p$ and 382$n$, and can bidirectionally input and output DC power between the pair of primary-side input/output terminals 381$p$ and 381$n$ and the pair of secondary-side input/output terminals 382$p$ and 382$n$. The pair of primary-side input/output terminals 381$p$ and 381$n$ of the first DC power supply 38A are connected to both positive and negative electrodes of the main battery 37, respectively. Further, the pair of secondary-side input/output terminals 382p and 382n of the first DC power supply 38A are connected to the second switch unit 32 and the variable voltage power supply 7 on the third power line 23, respectively. A detailed circuit configuration of the first DC power supply 38A is almost the same as that of the variable voltage power supply 7, and thus detailed description thereof will not be given.

The second DC power supply 39A is an isolated bidirectional DC/DC converter that includes a primary-side circuit that is connected to a pair of primary-side input/output terminals 391p and 391n and a secondary-side circuit that is insulated from the primary-side circuit and is connected to a pair of secondary-side input/output terminals 392p and 392n, and can bidirectionally input and output DC power between the pair of primary-side input/output terminals 391p and 391n and the pair of secondary-side input/output terminals 392p and 392n. The pair of primary-side input/output terminals 391p and 391n of the second DC power supply 39A are connected to both positive and negative electrodes of the main battery 37, respectively. Further, the pair of secondary-side input/output terminals 392p and 392n of the second DC power supply 39A are connected to the load 4 and the variable voltage power supply 7 on the fourth power line 24, respectively. A detailed circuit configuration of the second DC power supply 39A is almost the same as that of the variable voltage power supply 7, and thus detailed description thereof will not be given.

The DC power supply controller 63A turns on the first DC power supply 38A by driving the primary-side circuit and/or the secondary-side circuit of the first DC power supply 38A, transforms the power of the main battery 37 to output it to the third power line 23, and transforms the power in the third power line 23 to output it to the main battery 37. The DC power supply controller 63A turns on the second DC power supply 39A by driving the primary-side circuit and/or the secondary-side circuit of the second DC power supply 39A, transforms the power of the main battery 37 to output it to the fourth power line 24, and transforms the power in the fourth power line 24 to output it to the main battery 37.

According to the power supply system 1A of the present embodiment, the following effects can be obtained in addition to the effects of (1) to (10) described above.

(13) In the power supply system 1A, the first DC power supply 38A is the isolated bidirectional DC/DC converter in which the primary-side circuit is connected to the main battery 37 and the secondary-side circuit is connected to the third power line 23, the second DC power supply 39A is the isolated bidirectional DC/DC converter in which the primary-side circuit is connected to the main battery 37 and the secondary-side circuit is connected to the fourth power line 24, and the DC power supply controller 63A turns on the DC power supplies 38A and 39A by driving the primary-side circuit and/or the secondary-side circuit. According to the power supply system 1A, the main battery 37 can be charged with the power that is transformed by the first DC power supply 38A when the variable voltage power supply 7 and the first DC power supply 38A are connected in series to the load 4 during regeneration, and the main battery 37 can be charged with the power that is transformed by the DC power supplies 38A and 39A when the variable voltage power supply 7, and the DC power supplies 38A and 39A are connected in series to the load 4 during regeneration.

In the embodiment described above, the multi-stage voltage power supply 3A is a four-level DC voltage power supply in which a bottom unit 27, a middle unit 28A, and a top unit 29A are stacked to be capable of outputting DC voltages of four stages, but the number of stacked units is not limited thereto. For example, a three-level DC voltage power supply may be used in which the top unit is stacked on the bottom unit to be capable of outputting DC voltages of three stages. Further, a (n+3)—level DC voltage power supply may be used in which n-stage middle units (n is an integer of 2 or more) are it stacked between the top unit and the bottom unit to be capable of outputting DC voltages of (n+3) stages.

In the present embodiment, the case has been described in which the variable voltage power supply 7 is used as the isolated bidirectional DC/DC converter described with reference to FIG. 2, but the present invention is not limited thereto. As described in the second embodiment, the front-stage converter 73 serving as an isolated bidirectional DC/DC converter and the rear-stage converter 80 serving as a bidirectional DC/DC converter may be used as the variable voltage power supply 7A by a combination in series.

Fourth Embodiment

A vehicle as a moving body according to a fourth embodiment of the present invention will be described with reference to the drawings.

Figure 10:
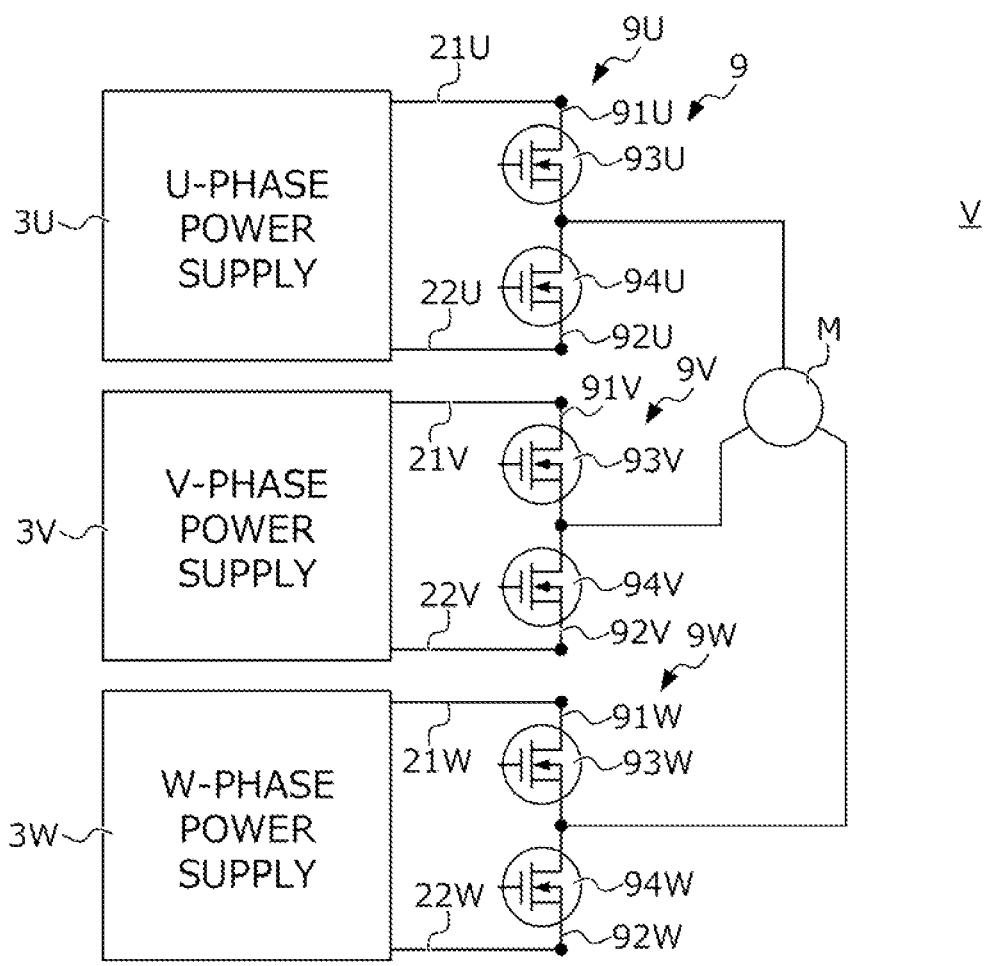
FIG. 10 is a diagram showing a circuit configuration of a vehicle according to a fourth embodiment of the present invention.

FIG. 10 is a diagram showing a circuit configuration of a vehicle V according to the present embodiment.

The vehicle V includes an AC rotating electrical machine M coupled to drive wheels (not shown) and generates a propulsive force for driving the vehicle V, a U-phase power supply 3U, a V-phase power supply 3V, a W-phase power supply 3W, and an inverter circuit 9 that connects the power supplies 3U, 3V, and 3W and the AC rotating electrical machine M. In the present embodiment, a case will be mainly described in which the vehicle V accelerates and decelerates by the power generated by the AC rotating electrical machine M, but the present invention is not limited thereto. The vehicle V may be a so-called hybrid vehicle equipped with the AC rotating electrical machine M and an engine as a power generation source.

The U-phase power supply 3U includes the multi-stage voltage power supply 3 according to the first embodiment, which is the three-level DC voltage power supply capable of outputting the DC voltage of three stages of 0, E1, and E1+E2 [V] from the power lines 21U and 22U, or the multi-stage voltage power supply 3A according to the third embodiment, which is the four-level DC voltage power supply capable of outputting the DC voltage of four stages of 0, E1, E1+E2, and E1+E2+E3 [V] from the power lines 21U and 22U.

The V-phase power supply 3V includes the multi-stage voltage power supply 3 according to the first embodiment, which is the three-level DC voltage power supply capable of outputting the DC voltage of three stages of 0, E1, and E1+E2 [V] from the power lines 21V and 22V, or the multi-stage voltage power supply 3A according to the third embodiment, which is the four-level DC voltage power supply capable of outputting the DC voltage of four stages of 0, E1, E1+E2, and E1+E2+E3 [V] from the power lines 21V and 22V.

Further, the W-phase power supply 3W includes the multi stage voltage power supply 3 according to the first embodiment, which is the three-level DC voltage power supply capable of outputting the DC voltage of three stages of 0, E1, and E1+E2 [V] from the power lines 21W and 22W, or the multi stage voltage power supply 3A according to the third embodiment, which is the four-level DC voltage power supply capable of outputting the DC voltage of four stages of 0, E1, E1+E2, and El1+E2+E3 [V] from the power lines 21W and 22W.

The AC rotating electrical machine M is coupled to the drive wheels through a power transmission mechanism (not shown). When three-phase AC power is supplied from the power supplies 3U, 3V, and 3W to the AC rotating electrical machine M, drive torque generated by the AC rotating electrical machine M is transmitted to the drive wheels through the power transmission mechanism (not shown) to rotate the drive wheels and to make the vehicle V run. Further, the AC rotating electrical machine M exerts a function of a generator during deceleration of the vehicle V, generates regenerative power, and applies regenerative braking torque according to a magnitude of the regenerative power to the drive wheels. The regenerative power generated by the AC rotating electrical machine M is appropriately charged in the battery of the power supplies 3U, 3V, and 3W.

The inverter circuit 9 includes a U-phase leg 9U connected to a U-phase of the AC rotating electrical machine M, a V-phase leg 9V connected to a V-phase of the AC rotating electrical machine M, and a W-phase leg 9W connected to a W-phase of the AC rotating electrical machine M.

The U-phase leg 90 includes a first U-phase power line 91U that connects a first power line 21U of the U-phase power supply 30 and the U-phase of the AC rotating electrical machine M, a second U-phase power line 92U that connects a second power line 22U of the U-phase power supply 3U and the U-phase of the AC rotating electrical machine M, a U-phase upper arm switching element 93U provided on the first U-phase power line 910, and a U-phase lower arm switching element 94U provided on the second U-phase power line 92U. In other words, the power lines 21U and 22U of the U-phase power supply 3U, which is the multi-stage voltage power supply, are connected to both ends of the U-phase leg 9U, respectively.

The V-phase leg 9V includes a first V-phase power line 91V that connects a first power line 21V of the V-phase power supply 3V and the V-phase of the AC rotating electrical machine M, a second V-phase power line 92V that connects a second power line 22V of the V-phase power supply 3V and the V-phase of the AC rotating electrical machine M, a V-phase upper arm switching element 93V provided on the first V-phase power line 91V, and a V-phase lower arm switching element 94V provided on the second V-phase power line 92V. In other words, the power lines 21V and 22V of the V-phase power supply 3V, which is the multi-stage voltage power supply, are connected to both ends of the V-phase leg 9V, respectively.

The W-phase leg 9W includes a first W-phase power line 91W that connects a first power line 21W of the W-phase power supply 3W and the W-phase of the AC rotating electrical machine M, a second W-phase power line 92W that connects a second power line 22W of the W-phase power supply 3W and the W-phase of the AC rotating electrical machine M, a W-phase upper arm switching element 93W provided on the first W-phase power line 91W, and a W-phase lower arm switching element 94W provided on the second W-phase power line 92W. In other words, the power lines 21W and 22W of the W-phase power supply 3W, which is the multi-stage voltage power supply, are connected to both ends of the W-phase leg 9W, respectively.

According to the vehicle of the present embodiment, the following effect can be obtained.

(14) The vehicle V includes the AC rotating electrical machine M that generates the propulsive force and the U-phase power supply 3U, the V-phase power supply 3V, and the W-phase power supply 3W that are the multi-stage power supply capable of being switching between the one-stage connection and the two-stage connection as described above. In the vehicle V, the U-phase power supply 3U is connected to both ends of the U-phase leg 9U connected to the U-phase of the AC rotating electrical machine M, the V-phase power supply 3V is connected to both ends of the V-phase leg 9V connected to the V-phase of the AC rotating electrical machine M, and the W-phase power supply 3W is connected to both ends of the W-phase leg 9W connected to the W-phase of the AC rotating electrical machine M. Therefore, according to the vehicle V, since it is not necessary to increase the number of arm switches included in the legs 9U, 9V, and 9W of respective phases when the voltage is increased in multiple stages, the switching loss and the steady loss in the legs 9I), 9V, and 9W of respective phases can be reduced accordingly. Further, according to the vehicle V, since the withstand voltage of the switches included in the power supplies 3U, 3V, and 3W of the respective phases can be lowered, the steady loss in the switches can be lowered, and the costs of the switches can also be reduced. Further, according to the vehicle V, since it is not necessary to operate the arm switches included in the legs 9U, 9V, and 9W of the respective phases in order to change the voltage during the high-voltage application (during two-stage connection or during three-stage connection), the high frequency component of the voltage applied to the AC rotating electrical machine M can be reduced, whereby the iron loss can also be reduced.

Although the embodiments of the present invention have been described above, the present invention is not: limited thereto. Within the scope of the present invention, the detailed configuration may be changed as appropriate.

For example, in the above-described embodiments, the case has been described in which the full bridge isolated bidirectional DC/DC converter shown in FIG. 2 is used as the variable voltage power supply 7 and the front-stage converter 73, but the present invention is not limited thereto.

Figure 11:
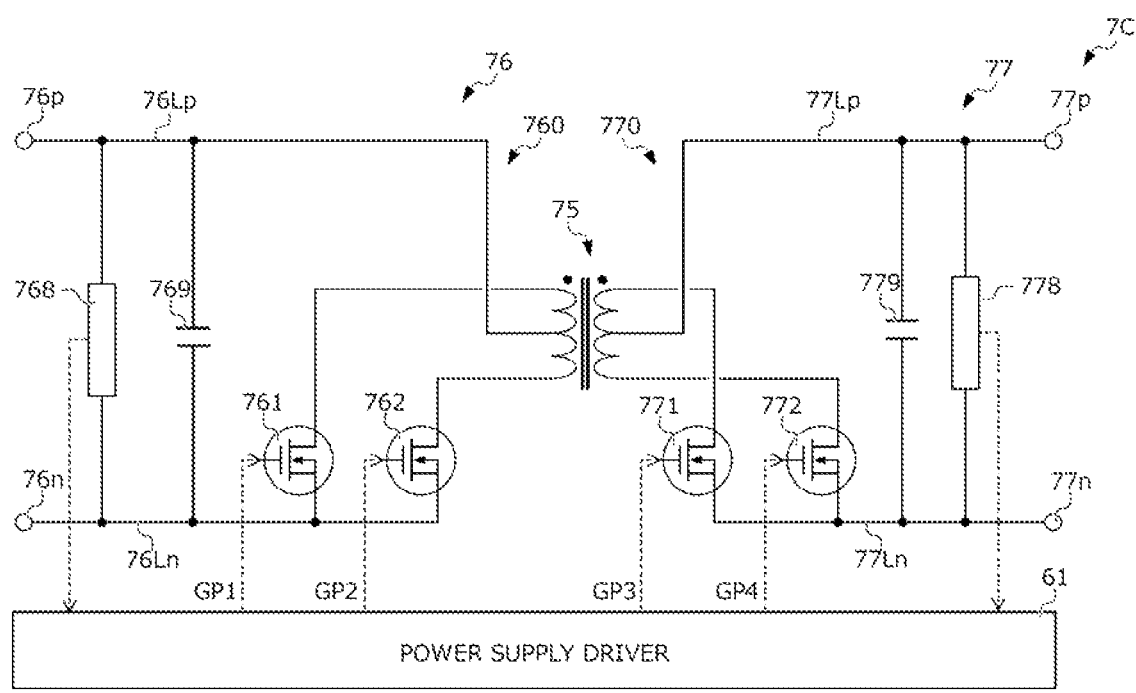
FIG. 11 is a diagram showing another example of a circuit configuration of the variable voltage power supply.

FIG. 11 is a diagram showing another example of the circuit configuration of the variable voltage power supply. FIG. 11 shows a case where a variable voltage power supply 7C is a so-called push-pull isolated bidirectional DC/DC converter.

The variable voltage power supply 7C includes an insulation transformer 75 having a primary coil and a secondary coil, a primary-side circuit 76 in which a primary side of the insulation transformer 75 is connected to a pair of primary-side input/output terminals 76p and 76n, and a secondary-side circuit 77 in which a secondary side of the insulation transformer 75 is connected to a pair of secondary-side input/output terminals 77p and 77n. As shown in FIG. 11, the insulation transformer 75 of the variable voltage power supply 7C is different from the insulation transformer 70 of the variable voltage power supply 7 shown in FIG. 2 in that both of the primary coil and the secondary coil are a center tap type.

The primary-side circuit 76 includes a positive electrode power line 76Lp that connects the primary-side positive electrode input/output terminal 76p and a center tap of the primary coil of the insulation transformer 75, a negative electrode power line 76Ln connected to the primary-side negative electrode input/output terminal 76n, a primary-side synchronous full-wave rectifier circuit 760 that connects these power lines 76Lp and 76Ln and the primary coil of the insulation transformer 75, and a primary-side voltage sensor 768 and a smoothing capacitor 769 that are connected to each other in parallel between the positive electrode power line 76Lp and the negative electrode power line 76Ln.

The primary-side synchronous full-wave rectifier circuit 760 includes a first switching element 761 that connects one end side of the primary coil of the insulation transformer 75 and the negative electrode power line 76Ln, and a second switching element 762 that connects the other end side of the primary coil of the insulation transformer 75 and the negative electrode power line 76Ln. Each of these switching elements 761 and 762 is switched on or off according to on/off of the gate drive signals GP1 and GP2 input from the power supply driver 61. In the example shown in FIG. 11, the case has been described in which an N-channel MOSFET including a body diode, which allows a current from a source to a drain, is used as these switching elements 761 and 762, but the present invention is not limited thereto. As these switching elements 761 and 762, a known switching element such as an IGBT or a JFET may be used in addition to the MOSFET.

Drains of the switching elements 761 and 762 are connected to both ends of the primary coil of the insulation transformer 75, respectively, and sources of the switching elements 761 and 762 are connected to the negative electrode power line 76Ln.

The secondary-side circuit 77 includes a positive electrode power line 77Lp that connects the secondary-side positive electrode input/output terminal 77p and a center tap of the secondary coil of the insulation transformer 75, a negative electrode power line 77Ln connected to the secondary-side negative electrode input/output terminal 77n, a secondary-side synchronous full-wave rectifier circuit 770 that connects these power lines 77Lp and 77Ln and the secondary coil of the insulation transformer 75, and a secondary-side voltage sensor 778 and a smoothing capacitor 779 that are connected to each other in parallel between the positive electrode power line 77Lp and the negative electrode power line 77Ln.

The secondary-side synchronous full-wave rectifier circuit 770 includes a first switching element 771 that connects one end side of the secondary coil of the insulation transformer 75 and the negative electrode power line 77Ln, and a second switching element 772 that connects the other end side of the secondary coil of the insulation transformer 75 and the negative electrode power line 77Ln. Each of these switching elements 771 and 772 is switched on or off according to on/off of the gate drive signals GP3 and GP2 input from the power supply driver 61 in the example shown in FIG. 11, the case has been described in which an N-channel MOSFET including a body diode, which allows a current from a source to a drain, is used as these switching elements 771 and 772, but the present invention is not limited thereto. As these switching elements 771 and 772, a known switching element such as an 1GBT or a JFET may be used in addition to the MOSFET.

Drains of the switching elements 771 and 772 are connected to both ends of the primary coil of the insulation transformer 75, respectively, and sources of the switching elements 771 and 772 are connected to the negative electrode power line 77Ln.

What is claimed is:

1. A power supply system comprising: a variable voltage power supply that outputs power of a variable voltage from a pair of first terminals; and
    a first power line and a second power line that connect the pair of first terminals and a load;
    a first switch that is provided on the first power line;
    a third power line that connects both ends of the first switch; and
    a bypass line that connects the pair of first terminals, wherein
    the third power line is provided with a first DC power supply that outputs DC power, and
    the bypass line is provided with a bypass diode that allows an output current of the first DC power supply and cuts off a current reverse to the output current.

2. The power supply system according to claim 1, further comprising: a second switch that is provided closer to the load than the first DC power supply of the third power line;
    a fourth power line that connects both ends of the second switch; and
    a second DC power supply that is provided on the fourth power line.

3. The power supply system according to claim 2, wherein a first diode and the first switch are provided in parallel on the first power line, the first diode being configured to allow an output current of the variable voltage power supply and cut off a current reverse to the output current,
    the bypass diode and a bypass switch are provided in parallel on the bypass line, and
    a second diode and the second switch are provided in parallel on the third power line, the second diode being configured to allow the output current of the first DC power supply and cut off the current reverse to the output current.

4. The power supply system according to claim 3, further comprising a power supply driver that changes a voltage between the pair of first terminals from 0 to a predetermined maximum voltage by operating the variable voltage power supply.

5. The power supply system according to claim 3, further comprising a controller that controls the first switch, the second switch, the bypass switch, the first DC power supply, and the second DC power supply, based on a system voltage which is a voltage between the first and second power lines.

6. The power supply system according to claim 5, wherein, during power running in which power in the first and second power lines is supplied to the load,
    the controller turns off the second switch, the bypass switch, the first DC power supply, and the second DC power supply when changing the system voltage in a range less than a first voltage of the first DC power supply,
    the controller turns on the first DC power supply and turns off the first switch, the bypass switch, and the second DC power supply when changing the system voltage in a range larger than the first voltage and less than a sum of the first voltage and a second voltage of the second DC power supply, and
    the controller turns on the first DC power supply and the second DC power supply and turns off the first switch, the second switch, and the bypass switch when changing the system voltage in a range larger than the sum of the first voltage and the second voltage.

7. The power supply system according to claim 6, wherein, during the power running,
    the controller switches the first DC power supply from off to on before a voltage between the pair of first terminals becomes 0 when raising the system voltage across the first voltage,
    the controller switches the first DC power supply from on to off before the voltage between the pair of first terminals becomes the first voltage when lowering the system voltage across the first voltage, the controller switches the second DC power supply from off to on before the voltage between the pair of first terminals becomes 0 when raising the system voltage across the sum of the first voltage and the second voltage, and the controller switches the second DC power supply from on to off before the voltage between the pair of first terminals becomes the second voltage when lowering the system voltage across the sum of the first voltage and the second voltage.

8. The power supply system according to claim 5, wherein, during regeneration in which power in the load is supplied to the first and second power lines, the controller turns on the first switch and turns off the second switch, the bypass switch, the first DC power supply, and the second DC power supply when changing the system voltage in a range less than a first voltage of the first DC power supply, the controller turns on the second switch and the first DC power supply and turns off the first switch, the bypass switch, and the second DC power supply when changing the system voltage in a range larger than the first voltage and less than a sum of the first voltage and a second voltage of the second DC power supply, and the controller turns on the first DC power supply and the second DC power supply and turns off the first switch, the second switch, and the bypass switch when changing the system voltage in a range larger than the sum of the first voltage and the second voltage.

9. The power supply system according to claim 8, wherein, during the regeneration, the controller switches the first switch from on to off and switches the first DC power supply and the second switch from off to on before a voltage between the pair of first terminals becomes 0 when raising the system voltage across the first voltage, the controller switches the first switch from off to on and switches the first DC power supply and the second switch from on to off before the voltage between the pair of first terminals becomes the first voltage when lowering the system voltage across the first voltage, the controller switches the second switch from on to off and switches the second DC power supply from off to on before the voltage between the pair of first terminals becomes 0 when raising the system voltage across the sum of the first voltage and the second voltage, and the controller switches the second switch from off to on and switches the second DC power supply from on to off before the voltage between the pair of first terminals becomes the second voltage when lowering the system voltage across the sum of the first voltage and the second voltage.

10. The power supply system according to claim 8, wherein the controller turns on the bypass switch during the regeneration while the voltage between the pair of first terminals is 0.

11. The power supply system according to claim 5, wherein the first DC power supply includes a first battery and a first battery switch that are connected in series to the third power line, the second DC power supply includes a second battery and a second battery switch that are connected in series to the fourth power line, and the controller turns on the first DC power supply by turning on the first battery switch, and turns on the second DC power supply by turning on the second battery switch.

12. The power supply system according to claim 5, wherein the first DC power supply is an isolated bidirectional DC/DC converter in which a primary-side circuit is connected to a main battery and a secondary-side circuit is connected to the third power line, the second DC power supply is an isolated bidirectional DC/DC converter in which a primary-side circuit is connected to the main battery and a secondary-side circuit is connected to the fourth power line, and the controller turns on the first DC power supply by driving the primary-side circuit and/or the secondary-side circuit of the first DC power supply, and turns on the second DC power supply by driving the primary-side circuit and/or the secondary-side circuit of the second DC power supply.

13. The power supply system according to claim 4, further comprising a controller that controls the first switch, the second switch, the bypass switch, the first DC power supply, and the second DC power supply, based on a system voltage which is a voltage between the first and second power lines.

14. The power supply system according to claim 13, wherein, during power running in which power in the first and second power lines is supplied to the load, the controller turns off the second switch, the bypass switch, the first DC power supply, and the second DC power supply when changing the system voltage in a range less than a first voltage of the first DC power supply, the controller turns on the first DC power supply and turns off the first switch, the bypass switch, and the second DC power supply when changing the system voltage in a range larger than the first voltage and less than a sum of the first voltage and a second voltage of the second DC power supply, and the controller turns on the first DC power supply and the second DC power supply and turns off the first switch, the second switch, and the bypass switch when changing the system voltage in a range larger than the sum of the first voltage and the second voltage.

15. The power supply system according to claim 14, wherein, during the power running, the controller switches the first DC power supply from off to on before a voltage between the pair of first terminals becomes 0 when raising the system voltage across the first voltage, the controller switches the first DC power supply from on to off before the voltage between the pair of first terminals becomes the first voltage when lowering the system voltage across the first voltage, the controller switches the second DC power supply from off to on before the voltage between the pair of first terminals becomes 0 when raising the system voltage across the sum of the first voltage and the second voltage, and the controller switches the second DC power supply from on to off before the voltage between the pair of first terminals becomes the second voltage when lowering the system voltage across the sum of the first voltage and the second voltage.

16. The power supply system according to claim 13, wherein, during regeneration in which power in the load is supplied to the first and second power lines, the controller turns on the first switch and turns off the second switch, the bypass switch, the first DC power supply, and the second DC power supply when changing the system voltage in a range less than a first voltage of the first DC power supply, the controller turns on the second switch and the first DC power supply and turns off the first switch, the bypass switch, and the second DC power supply when changing the system voltage in a range larger than the first voltage and less than a sum of the first voltage and a second voltage of the second DC power supply, and the controller turns on the first DC power supply and the second DC power supply and turns off the first switch, the second switch, and the bypass switch when changing the system voltage in a range larger than the sum of the first voltage and the second voltage.

17. The power supply system according to claim 16, wherein, during the regeneration, the controller switches the first switch from on to off and switches the first DC power supply and the second switch from off to on before a voltage between the pair of first terminals becomes 0 when raising the system voltage across the first voltage, the controller switches the first switch from off to on and switches the first DC power supply and the second switch from on to off before the voltage between the pair of first terminals becomes the first voltage when lowering the system voltage across the first voltage, the controller switches the second switch from on to off and switches the second DC power supply from off to on before the voltage between the pair of first terminals becomes 0 when raising the system voltage across the sum of the first voltage and the second voltage, and the controller switches the second switch from off to on and switches the second DC power supply from on to off before the voltage between the pair of first terminals becomes the second voltage when lowering the system voltage across the sum of the first voltage and the second voltage.

18. The power supply system according to claim 16, wherein the controller turns on the bypass switch during the regeneration while the voltage between the pair of first terminals is 0.

19. The power supply system according to claim 13, wherein the first DC power supply includes a first battery and a first battery switch that are connected in series to the third power line, the second DC power supply includes a second battery and a second battery switch that are connected in series to the fourth power line, and the controller turns on the first DC power supply by turning on the first battery switch, and turns on the second DC power supply by turning on the second battery switch.

20. A moving body comprising: an AC rotating electrical machine that generates a propulsive force;

a U-phase power supply that is the power supply system according to claim 1;

a V-phase power supply that is the power supply system according to claim 1; and a W-phase power supply that is the power supply system according to claim 1, wherein the U-phase power supply is connected to both ends of a U-phase leg connected to a U-phase of the AC rotating electrical machine, the V-phase power supply is connected to both ends of a V-phase leg connected to a V-phase of the AC rotating electrical machine, and the W-phase power supply is connected to both ends of a W-phase leg connected to a W-phase of the AC rotating electrical machine.

* * * * *